United States Patent
Teruyama

(10) Patent No.: US 10,225,703 B2
(45) Date of Patent: Mar. 5, 2019

(54) COMMUNICATION CIRCUIT, COMMUNICATION APPARATUS, COMMUNICATION METHOD AND COMPUTER PROGRAM FOR ACQUIRING AVAILABLE SERVICES IN AN ACTIVE COMMUNICATION MODE AND A PASSIVE COMMUNICATION MODE USING NFC

(71) Applicant: Sony Corporation, Tokyo (JP)

(72) Inventor: Katsuyuki Teruyama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/121,255

(22) PCT Filed: Feb. 23, 2015

(86) PCT No.: PCT/JP2015/055088
§ 371 (c)(1),
(2) Date: Aug. 24, 2016

(87) PCT Pub. No.: WO2015/137105
PCT Pub. Date: Sep. 17, 2015

(65) Prior Publication Data
US 2016/0366540 A1 Dec. 15, 2016

(30) Foreign Application Priority Data
Mar. 14, 2014 (JP) .................. 2014-052007

(51) Int. Cl.
*H04W 4/20* (2018.01)
*H04B 5/00* (2006.01)
(Continued)

(52) U.S. Cl.
CPC ............ *H04W 4/20* (2013.01); *H04B 5/0031* (2013.01); *H04L 67/12* (2013.01); *H04W 4/80* (2018.02); *H04W 76/14* (2018.02)

(58) Field of Classification Search
CPC ..... H04W 4/008; H04W 4/20; H04W 76/046; H04W 76/023; H04B 5/0031
(Continued)

(56) References Cited

U.S. PATENT DOCUMENTS

2010/0130126 A1* 5/2010 Takayama ............ H04B 5/0031
455/41.1
2011/0279854 A1* 11/2011 Ido ...................... H04N 1/00342
358/1.15
(Continued)

FOREIGN PATENT DOCUMENTS

| JP | 2010-130311 A | 6/2010 |
| JP | 2011-259412 A | 12/2011 |
| JP | 2013-179582 A | 9/2013 |

OTHER PUBLICATIONS

Sep. 29, 2017, EP communication issued for related EP application No. 15761324.1.
(Continued)

*Primary Examiner* — Nay A Maung
*Assistant Examiner* — Angelica M Perez
(74) *Attorney, Agent, or Firm* — Paratus Law Group, PLLC

(57) ABSTRACT

There is provided a communication circuit through which it is possible to acquire information about a service available in an active communication mode and a passive communication mode if a connection of near field wireless communication is established in the active communication mode, the communication circuit configured to have an active communication mode and a passive communication mode that are provided as communication modes of near field wireless communication, and configured to, when a connection of the near field wireless communication is established in the active communication mode with another device, (Continued)

receive information about a service that uses the passive communication mode from the other device.

15 Claims, 25 Drawing Sheets

(51) Int. Cl.
    *H04L 29/08*     (2006.01)
    *H04W 4/80*     (2018.01)
    *H04W 76/14*     (2018.01)

(58) Field of Classification Search
    USPC .............................................. 455/41.1–41.3
    See application file for complete search history.

(56) References Cited

U.S. PATENT DOCUMENTS

| | | | |
|---|---|---|---|
| 2013/0005287 A1 | 1/2013 | Fujii et al. | |
| 2013/0165043 A1 | 6/2013 | Naniyat | |
| 2014/0206284 A1* | 7/2014 | Naniyat | H04W 4/008 455/41.1 |

OTHER PUBLICATIONS

Aug. 28, 2018, Japanese Office Action issued for related JP application No. 2016-507431.

* cited by examiner

FIG. 3

| NFCEE | PROTOCOL | AID OR SYSTEM CODE |
|---|---|---|
| NFCEE 140 | T3T<br>T4AT<br>T4BT<br>LLCP | AID11 '11001122334455667788899AABBCCDDEE'<br>SC 11 '0011'<br>WKS '0021' |

FIG. 5

| NFCEE | PROTOCOL | AID OR SYSTEM CODE |
|---|---|---|
| NFCEE 140a | T3T<br>T4AT<br>T4BT<br>LLCP | AID11 '11001122334455667788999AABBCCDDEE'<br>SC 11 '0011'<br>WKS '0021' |
| NFCEE 140b | T3T | SC 21 '0021'<br>SC 22 '0022'<br>SC 23 '0023'<br>SC 24 '0024' |
| NFCEE 140c | T4AT<br>T4BT | AID31 '31001122334455667788999AABBCCDDEE'<br>AID32 '32001122334455667788999AABBCCDDEE' |

FIG. 10

| b8 | b7 | b6 | b5 | b4 | b3 | b2 | b1 | DESCRIPTION |
|---|---|---|---|---|---|---|---|---|
| 1 |  |  |  |  |  |  |  | SERVICE OF NFC-DEP IS AVAILABLE ON NFC-A<br>A service using NFC-DEP Protocol available on NFC-A in passive communication mode |
|  | 1 |  |  |  |  |  |  | SERVICE OF NFC-DEP IS AVAILABLE ON NFC-F<br>A service using NFC-DEP Protocol available on NFC-F in passive communication mode |
|  |  | 1 |  |  |  |  |  | SERVICE OF TYPE 3 TAG PLATFORM IS AVAILABLE ON NFC-F<br>A service using Type 3 Tag Platform available on NFC-F in passive communication mode |
|  |  |  | 1 |  |  |  |  | SERVICE OF TYPE 4 TAG PLATFORM IS AVAILABLE ON NFC-A<br>A service using Type 4 Tag Platform available on NFC-A in passive communication mode |
|  |  |  |  | 1 |  |  |  | SERVICE OF TYPE 4 TAG PLATFORM IS AVAILABLE ON NFC-B<br>A service using Type 4 Tag Platform available on NFC-B in passive communication mode |
|  |  |  |  |  | 1 |  |  | SAME SERVICES ARE AVAILABLE ON NFC-A AND NFC-B<br>The same services available on NFC-A and NFC-B in passive communication mode |
|  |  |  |  |  |  | 1 |  | BIT RATE 424 KBPS OF NFC-F IS AVAILABLE<br>NFC-F bit rate 424 kbps available in passive communication mode |
|  |  |  |  |  |  |  | 1 | BIT RATE 212 KBPS OF NFC-F IS AVAILABLE<br>NFC-F bit rate 212 kbps available in passive communication mode |

FIG. 11

| b8 | b7 | b6 | b5 | b4 | b3 | b2 | b1 | DESCRIPTION |
|----|----|----|----|----|----|----|----|-------------|
| 0  | 0  | 0  | 0  | 0  | 0  | 0  | 0  | RESERVED FOR FUTURE USE RFU |

FIG. 12

| Tag | Len | NFCEE SERVICE DATA |
|---|---|---|
| '03' | 2 | NFC Forum Well-Known SERVICE LIST |
| '10' | 5-16 | ISO/IEC 7816-4 AID |
| '11' | 2 | JIS X 6319-4 SYSTEM CODE |

FIG. 13

| '11' | 2 | '0021' | '11' | 2 | '0022' | '11' | 2 | '0023' | '11' | 2 | '0024' |

FIG. 15

| B1 | B2 | B3 | B4 | B5 | B6 | B7 | B8 | B9 | B10 |
|----|----|----|----|----|----|----|----|----|-----|
| XX | XX | XX | XX | XX | XX | XX | XX | '3F' | '00' |

FIG. 16

| '03' | 2 | WKS '0021' | '11' | 2 | SC11 '0011' | '10' | 16 | AID11 '1100112233445566778899AABBCCDDEE' |

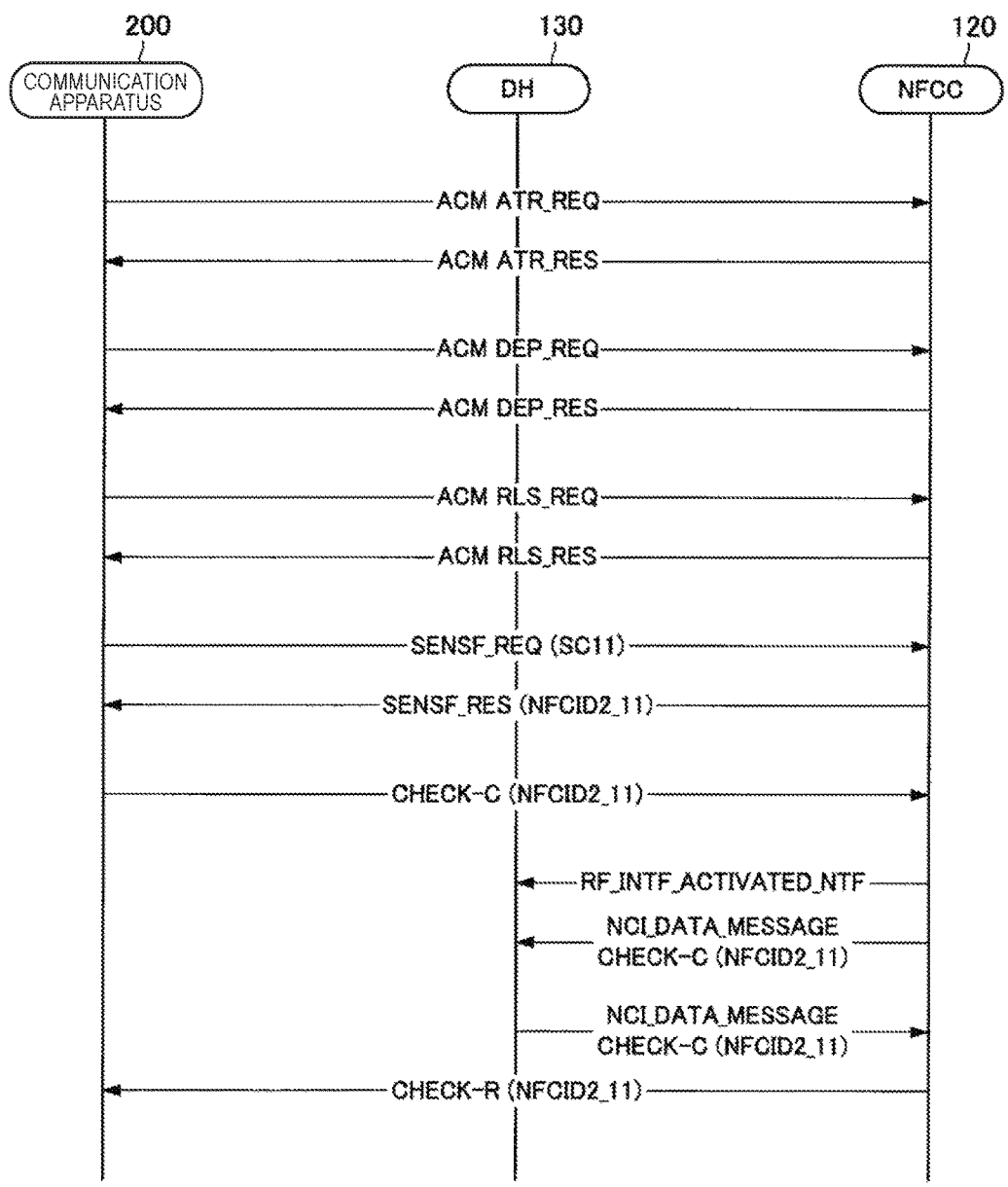

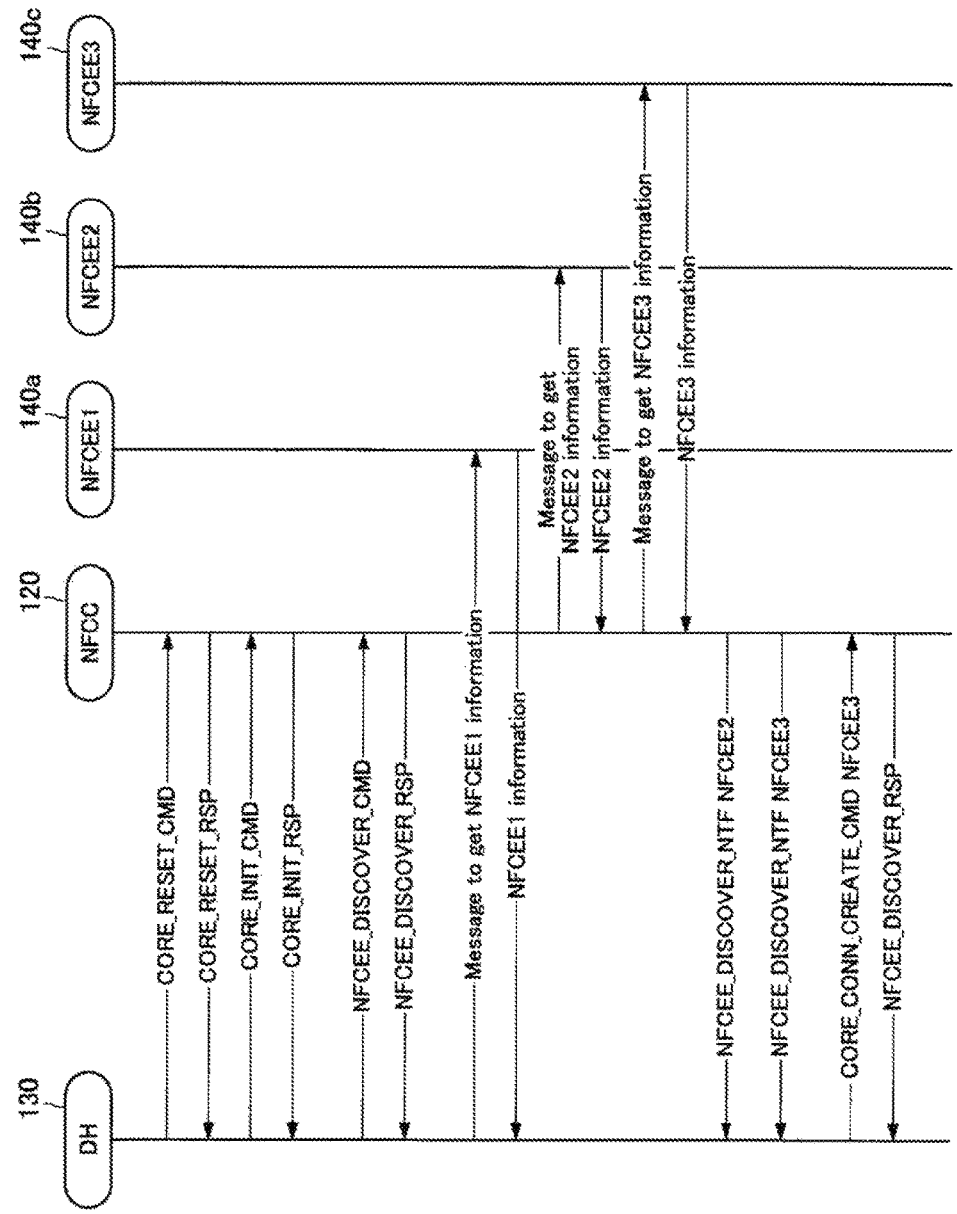

FIG. 20

| '11' | 2 | SC11 '0011' | '10' | 16 | AID11 '110011223344556677 8899AABBCCDDEE' |

| '11' | 2 | SC21 '0021' | '11' | 2 | SC22 '0022' |

| '11' | 2 | SC23 '0023' | '11' | 2 | SC24 '0024' |

| '10' | 16 | AID31 '310011223344556677 8899AABBCCDDEE' |

| '10' | 16 | AID32 '320011223344556677 8899AABBCCDDEE' |

FIG. 21

| SC11 '0011' | NFCID2_11 '02FE1111111111111' |

COMMUNICATION CIRCUIT, COMMUNICATION APPARATUS, COMMUNICATION METHOD AND COMPUTER PROGRAM FOR ACQUIRING AVAILABLE SERVICES IN AN ACTIVE COMMUNICATION MODE AND A PASSIVE COMMUNICATION MODE USING NFC

CROSS REFERENCE TO PRIOR APPLICATION

This application is a National Stage Patent Application of PCT International Patent Application No. PCT/JP2015/055088 (filed on Feb. 23, 2015) under 35 U.S.C. § 371, which claims priority to Japanese Patent Application No. 2014-052007 (filed on Mar. 14, 2014), which are all hereby incorporated by reference in their entirety.

TECHNICAL FIELD

The present disclosure relates to a communication circuit, a communication apparatus, a communication method and a computer program.

BACKGROUND ART

Near field wireless communication systems in which an integrated circuit (IC) card is used and information is delivered through communication according to electromagnetic induction using carrier waves of a single frequency in a short distance and a non-contact manner are widely used. Use of such near field wireless communication systems for, for example, an electronic ticket or electronic money is widely known. In addition, recently, mobile phones including a function of an electronic ticket or electronic money using near field wireless communication has been proliferated.

Near field wireless communication systems have spread rapidly on a global scale, and some of such systems have become international standards. For example, ISO/IEC 14443, which is a standard of proximity IC card systems, and ISO/IEC 18092, which is a standard of NFCIP (Near Field Communication Interface and Protocol)-1, are included in the international standards of near field wireless communication systems.

Accordingly, various techniques using near field wireless communication systems are proposed. For example, Patent Literature 1 discloses a technique in which near field wireless communication is used, information of a faster wireless communication scheme than a near field wireless communication scheme is exchanged, and information is exchanged using the wireless communication scheme.

In near field communication (NFC), which is a standard of near field wireless communication, two communication modes including an active communication mode and a passive communication mode are defined. The active communication mode is a mode in which both an initiator and a target emit radio waves and perform communication. The passive communication mode is a mode in which a target generates power by radio waves emitted by an initiator and performs communication.

CITATION LIST

Patent Literature

[Patent Literature 1] JP 2008-271151A

SUMMARY OF INVENTION

Technical Problem

When a device (hereinafter referred to as an "NFC device") configured to perform near field wireless communication using NFC can use a service that uses both an active communication mode and a passive communication mode, it is preferable that a communication mode of near field wireless communication be flexibly switched between an active communication mode and a passive communication mode.

Therefore, the present disclosure proposes a communication circuit, a communication apparatus, a communication method and a computer program which are novel and improved and through which it is possible to acquire information about a service available in an active communication mode and a passive communication mode if a connection of near field wireless communication is established in the active communication mode when it is possible to use a service that uses both of the active communication mode and the passive communication mode.

Solution to Problem

According to the present disclosure, there is provided a communication circuit configured to have an active communication mode and a passive communication mode that are provided as communication modes of near field wireless communication, and configured to, when a connection of the near field wireless communication is established in the active communication mode with another device, receive information about a service that uses the passive communication mode from the other device.

According to the present disclosure, there is provided a communication apparatus including: a communication circuit configured to have an active communication mode and a passive communication mode that are provided as communication modes of near field wireless communication, and configured to, when a connection of the near field wireless communication is established in the active communication mode with another device, receive information about a service that uses the passive communication mode from the other device; and a control unit capable of performing communication with the communication circuit.

According to the present disclosure, there is provided a communication method including, when an active communication mode and a passive communication mode are provided as communication modes of near field wireless communication and a connection of the near field wireless communication is established in the active communication mode with another device, receiving information about a service that uses the passive communication mode from the other device.

According to the present disclosure, there is provided a computer program causing a computer to execute, when an active communication mode and a passive communication mode are provided as communication modes of near field wireless communication and a connection of the near field wireless communication is established in the active communication mode with another device, receiving information about a service that uses the passive communication mode from the other device.

Advantageous Effects of Invention

As described above, according to the present disclosure, it is possible to provide a communication circuit, a communication apparatus, a communication method and a computer program which are novel and improved and through which it is possible to acquire information about a service available in an active communication mode and a passive communication mode if a connection of near field wireless communication is established in the active communication mode when it is possible to use a service that uses both of the active communication mode and the passive communication mode.

Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 3 is an explanatory diagram which shows an example of NFC protocol information and service identification information.

FIG. 5 is an explanatory diagram which shows an example of NFC protocol information and service identification information.

FIG. 10 is an explanatory diagram which shows an example of encoding of a ninth byte of NFCID3.

FIG. 11 is an explanatory diagram which shows an example of encoding of a tenth byte of NFCID3.

FIG. 12 is an explanatory diagram which shows an example of NFCEE service information.

FIG. 13 is an explanatory diagram which shows an example of NFCEE service information.

FIG. 15 is an explanatory diagram which shows an example of available service information.

FIG. 16 is an explanatory diagram which shows an example of NFCEE service information.

FIG. 17 is an explanatory diagram which shows an example of parameters.

FIG. 18 is a sequence diagram which shows an operation example of the communication apparatus 100 according to an embodiment of the present disclosure.

FIG. 19A is a sequence diagram which shows an operation example of the communication apparatus 100 according to an embodiment of the present disclosure.

FIG. 20 is an explanatory diagram which shows an example of NFCEE service information.

FIG. 21 is an explanatory diagram which shows an example of NFCEE service information.

DESCRIPTION OF EMBODIMENT(S)

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

The description will be given in the following order.
1. Embodiment of the present disclosure
 1.1. System configuration example
 1.2. Functional configuration example of communication apparatus
 1.3. Operation example of communication apparatus
 1.4. Hardware configuration example
2. Conclusion <1. Embodiment Of The Present Disclosure>
[System Configuration Example]

Figure 1:
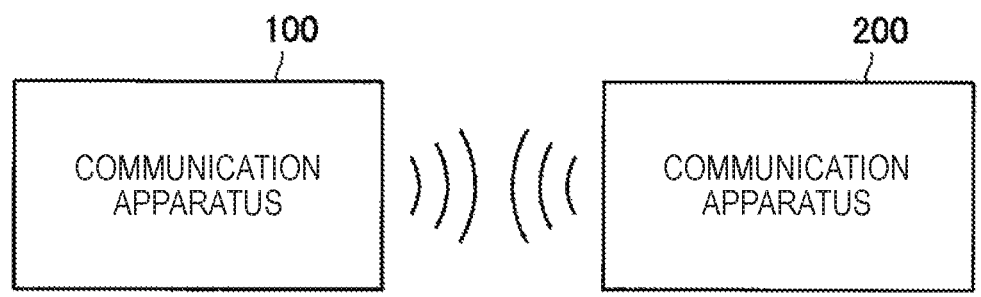
FIG. 1 is an explanatory diagram which shows a configuration example of a near field wireless communication system 1 according to an embodiment of the present disclosure.

First, a configuration example of a near field wireless communication system according to an embodiment of the present disclosure will be described. FIG. 1 is an explanatory diagram which shows a configuration example of a near field wireless communication system 1 according to an embodiment of the present disclosure. Hereinafter, a configuration example of a near field wireless communication system according to an embodiment of the present disclosure will be described by using FIG. 1.

As shown in FIG. 1, the near field wireless communication system 1 according to an embodiment of the present disclosure is constituted of communication apparatuses 100 and 200. The communication apparatuses 100 and 200 are both communication apparatuses (NFC devices) which perform near field wireless communication using a frequency of 13.56 MHz by one or both of ISO/IEC 18092 and ISO/IEC 14443. Further, the communication apparatuses 100 and 200 may both be communication apparatuses which perform near field wireless communication by logical link control protocol (LLCP), which is an upper layer protocol of an ISO/IEC 18092 transport protocol. The communication apparatuses 100 and 200 are apparatuses that can perform near field wireless communication with other devices, and include, for example, a mobile phone, a multi-functional mobile phone that mainly includes a display and a touch panel as a user interface device, a tablet portable terminal, and a personal computer.

The communication apparatuses 100 and 200 can both operate as either a polling device or a listening device. The polling device forms a so-called RF (Radio Frequency) field (magnetic field) by generating electromagnetic waves, transmits a polling command for detecting the listening device as a remote target, and waits for a response from the listening device. That is, the polling device performs the operations of a PCD (Proximity Coupling Device) of ISO/IEC 14443, or the operations of an initiator for an active communication mode or a passive communication mode of ISO/IEC 18092.

In the present embodiment, the communication apparatuses 100 and 200 support at least one of the following three RF technologies.

<RF Technology>
(1) NFC-A . . . communication scheme of Type A of ISO/IEC 14443
(2) NFC-B . . . communication scheme of Type B of ISO/IEC 14443
(3) NFC-F . . . communication scheme of 212 kbps and 424 kbps in ISO/IEC 18092

NFC-A is an abbreviation for Type A of ISO/IEC 14443. NFC-B is an abbreviation for Type B of ISO/IEC 14443. NFC-F is an abbreviation for a communication scheme of 212 kbps and 424 kbps in ISO/IEC 18092.

In addition, in the present embodiment, the communication apparatuses 100 and 200 support at least one of the following RF protocols.

<RF Protocol>
(1) T3T . . . TYPE 3 TAG PLATFORM Protocol (based on Type NFC-F)
(2) ISO-DEP . . . ISO-DEP Protocol (ISO/IEC 14443-4 based on Type NFC-A or NFC-B)/TYPE 4 TAG PLATFORM Protocol (based on Type NFC-A or NFC-B)
(3) NFC-DEP . . . NFC-DEP Protocol (ISO/IEC 18092 transport protocol based on NFC-A or NFC-F)

When the listening device receives the polling command which the polling device transmits by forming an RF field, the listening device responds by a polling response. That is, the listening device performs the operations of a PICC of ISO/IEC 14443, or the operations of a target in a passive communication mode of ISO/IEC 18092. Therefore, the communication apparatuses 100 and 200 can be set with the same hardware configuration.

In "Activity Technical Specification" of NFC Forum, processes of functions in NFC devices are defined. When two NFC devices perform communication, an operation mode in which a command is transmitted and a response is received is referred to as a Poll Mode, and an operation mode in which a command is received and a response is transmitted is referred to as a Listen Mode.

In Technology Detection Activity (TDA) of "Activity Technical Specification" of NFC Forum, in order to find a device (a target) in the Listen Mode, a processing sequence of a device (an initiator) in the Poll Mode is defined. In the TDA, Poll Commands of NFC-A, NFC-B, and NFC-F in a passive communication mode are sequentially transmitted to RF fields, and it is confirmed whether there is a response thereof. However, the response to the Poll Command in the passive communication mode does not include available service information. Also, the "service" in the NFC field includes a function that is provided when data is transmitted and received between NFC devices through near field wireless communication may be included, for example, an electronic money service, a mileage service, and a content (refers to music, images, documents, or combinations thereof) providing service.

In addition to the passive communication mode, when a Poll Command in an active communication mode is initially transmitted, a connection of near field wireless communication in the active communication mode is highly likely to be established as will be described below. In the present embodiment, establishment of a connection of near field wireless communication refers to a state in which a communication path of near field wireless communication is formed between two NFC devices and data exchange is possible through the communication path. When a connection of near field wireless communication between two NFC devices is established in the active communication mode, the initiator is unable to know whether there is a service that the target can use in the passive communication mode. When communication is performed between two NFC devices through near field wireless communication, it is preferable that a communication mode of near field wireless communication be flexibly switched to the active communication mode or the passive communication mode.

Therefore, in the present embodiment, a form in which, when a connection of near field wireless communication is established in the active communication mode, an NFC device of a target side transmits information about a service available in the passive communication mode to an initiator side is described. By transmitting information about a service available in the passive communication mode to the initiator side, when it is possible to use a service that uses both of the active communication mode and the passive communication mode, the initiator side can recognize all services available in the active communication mode and the passive communication mode.

In the description hereinafter, these configurations and operations will be described by taking up the communication apparatus 100. Further, the operations of the communication apparatus 200 will be additionally described as necessary when describing the operations of the communication apparatus 100.

Heretofore, a configuration example of a near field wireless communication system according to an embodiment of the present disclosure has been described by using FIG. 1. Next, a functional configuration example of the communication apparatus 100 according to an embodiment of the present disclosure will be described.

Figure 2:
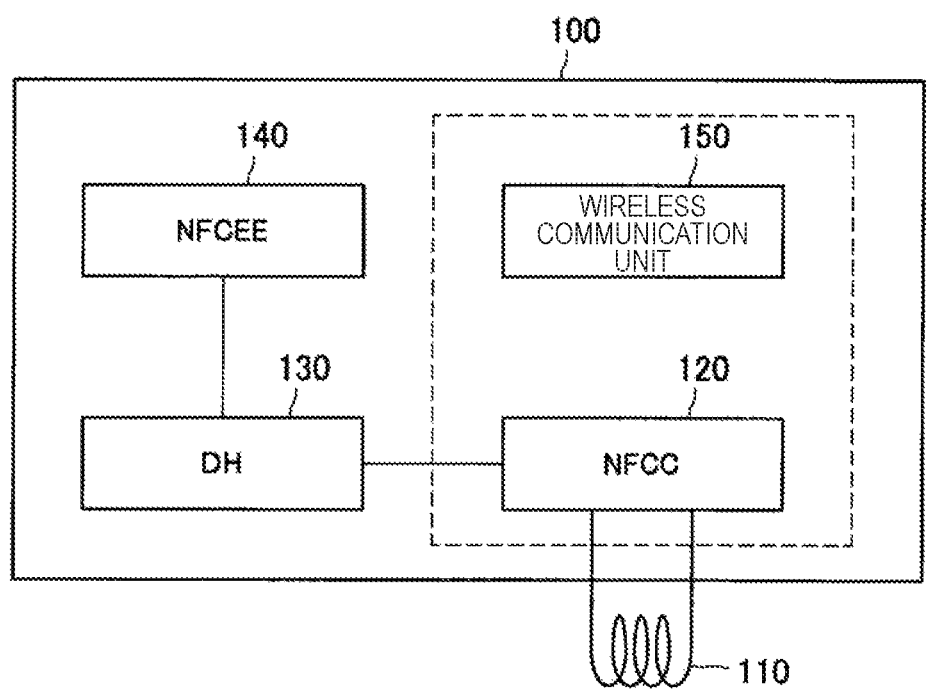
FIG. 2 is an explanatory diagram which shows a functional configuration example of a communication apparatus 100 according to an embodiment of the present disclosure.

FIG. 2 is an explanatory diagram which shows a functional configuration example of the communication apparatus 100 according to an embodiment of the present disclosure. Hereinafter, a functional configuration example of the communication apparatus 100 according to an embodiment of the present disclosure will be described by using FIG. 2.

As shown in FIG. 2, the communication apparatus 100 according to an embodiment of the present disclosure includes an antenna 110, an NFC controller (NFCC) 120, a device host (DH) 130, an NFC execution environment (NFCEE) 140 and a wireless communication unit 150.

The antenna 110 performs near field wireless communication with another device, for example, the communication apparatus 200. The antenna 110 includes a closed loop coil, and outputs electromagnetic waves (RF data) according to a change in a current flowing in the coil. Information transmitted from the antenna 110 is supplied from the NFCC 120. In addition, the information received by the antenna 110 is supplied to the NFCC 120.

The NFCC 120 is an example of a communication circuit of the present disclosure and performs data transmission through NFC. The NFCC 120 includes, for example, a single chip integrated circuit (IC), and delivers a signal received by the antenna 110 to the device host 130. The NFCC 120 performs communication with the device host 130 and exchanges information with the device host 130.

The NFCC 120 demodulates the signal (a current flowing in the antenna 110) received by the antenna 110 using, for example, amplitude shift keying (ASK), and transmits a Manchester code as demodulation data obtained as a result to the device host 130. The NFCC 120 may include, for example, a chip that performs near field wireless communication, and has a circuit configured to perform an operation to be described below.

In the present embodiment, when a connection of near field wireless communication is established in the active communication mode between the communication apparatus 100 and the communication apparatus 200, the NFCC 120 receives information about a service that uses the passive communication mode from the communication apparatus 200 and transmits the information about a service that uses the passive communication mode to the communication apparatus 200. When a connection of near field wireless communication is established in the active communication mode between the communication apparatus 100 and the communication apparatus 200, the NFCC 120 transmits and receives the information about a service that uses the passive communication mode to and from the communication apparatus 200. Accordingly, it is possible to acquire information about all services available in the active communication mode and the passive communication mode.

The device host 130 performs overall control of the communication apparatus 100. The device host 130 performs control of the NFCC 120, for example, control of initialization, setting, and power management. The device host 130 exchanges data with the NFCC 120. Therefore, the device host 130 controls an operation of the communication apparatus 100 using the data received from the NFCC 120. More specifically, the device host 130 generates a command for controlling the NFCC 120, and interprets a performance result in the NFCC 120 according to the command. That is, the device host 130 includes an interface for performing communication with the NFCC 120. As the interface included in the device host 130, for example, Inter-Integrated Circuit (I2C), universal asynchronous receiver transmitter (UART), or ISO-7816 can be used. When a peripheral device is connected to the communication apparatus 100, the device host 130 also performs control of an operation of the peripheral device.

The NFCEE 140 performs an executing process of an application using data transmitted through NFC. In the present embodiment, the NFCEE 140 is connected to the NFCC 120 through the device host 130. However, as will be described below, the NFCEE 140 may be directly connected to the NFCC 120.

The NFCEE 140 includes NFC protocol information and service identification information (for example, NFC Forum Well-Known service (WKS) list, JIS X 6319-4 system code (SC) and/or ISO/IEC 7816-4 AID). FIG. 3 is an explanatory diagram which shows an example of NFC protocol information and service identification information stored in the NFCEE 140. FIG. 3 shows protocols, Type 3 Tag (T3T), Type 4A Tag (T4AT), Type 4B Tag (T4BT), and LLCP, which are supported by the NFCEE 140. It is needless to say that information other than the information shown in FIG. 3 may be stored in the NFCEE 140.

The NFCEE 140 may perform processing and maintaining of secure data among processes necessary for the communication apparatus 100 to exchange data with the communication apparatus 200.

Specifications of NFCC, DH, and NFCEE are defined in "NFC Controller Interface Technical Specification" of NFC Forum.

The wireless communication unit 150 performs wireless data communication, and performs data communication by, for example, Wi-Fi or Bluetooth (registered trademark). The wireless communication unit 150 and the NFCC 120 may be formed in a single chip, or the wireless communication unit 150 and the NFCC 120 may be formed in separate chips.

The functional configuration example of the communication apparatus 100 according to an embodiment of the present disclosure has been described above with reference to FIG. 2. As described above, the NFCEE 140 may be directly connected to the NFCC 120. Another example of the communication apparatus 100 according to an embodiment of the present disclosure will be described.

Figure 4:
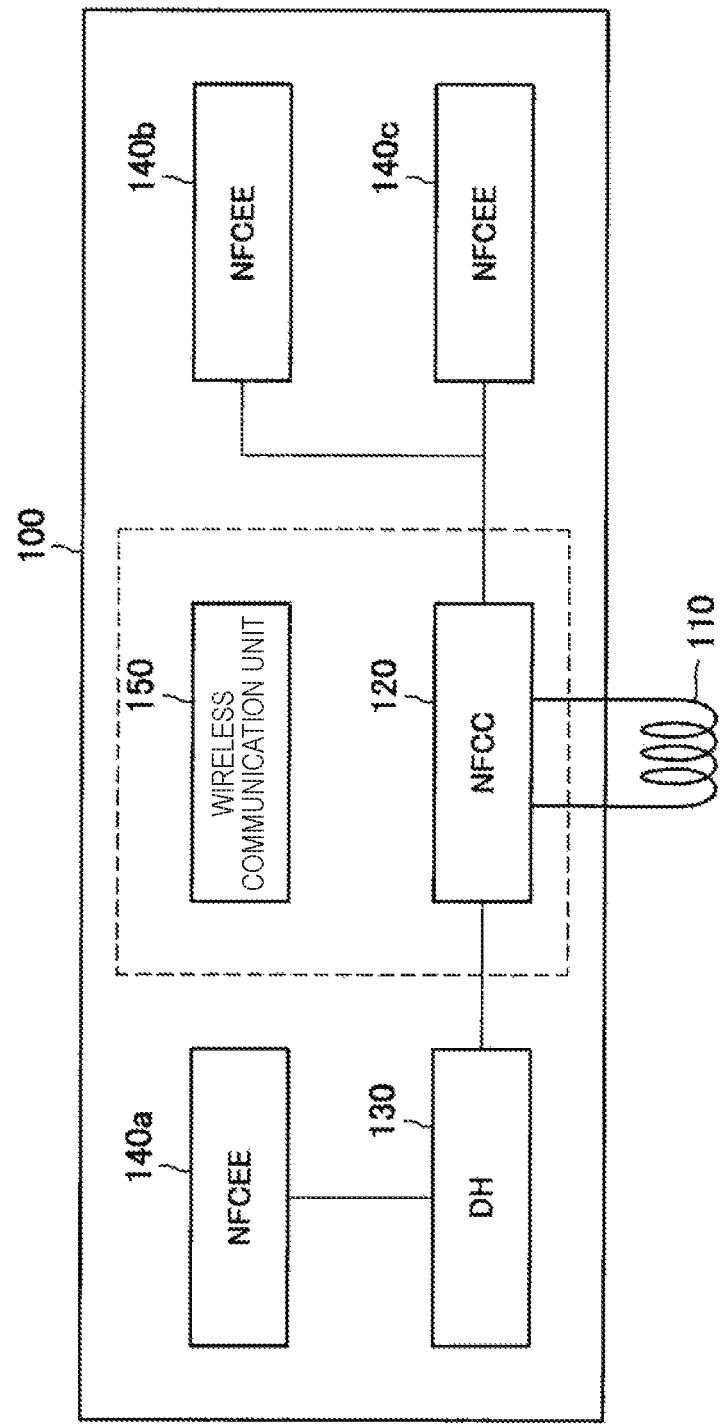
FIG. 4 is an explanatory diagram which shows a functional configuration example of a communication apparatus 100 according to an embodiment of the present disclosure.

FIG. 4 is an explanatory diagram which shows a functional configuration example of the communication apparatus 100 according to an embodiment of the present disclosure. As shown in FIG. 4, the communication apparatus 100 according to an embodiment of the present disclosure includes the antenna 110, the NFCC 120, the device host 130, the NFCEEs 140a, 140b, and 140c, and the wireless communication unit 150.

The communication apparatus 100 shown in FIG. 4 has a configuration in which the NFCEEs 140b and 140c directly connected to the NFCC 120 are added to the communication apparatus 100 shown in FIG. 2. FIG. 5 is an explanatory diagram which shows an example of NFC protocol information and service identification information stored in the NFCEEs 140a, 140b, and 140c. It is needless to say that information other than the information shown in FIG. 5 may be stored in the NFCEEs 140a, 140b, and 140c.

The above-described communication apparatus 100 has the Poll Mode and the Listen Mode as communication modes. The Poll Mode is a mode of a device in which electromagnetic waves are output, the electromagnetic waves are modulated, data is transmitted, and therefore another device is polled. The Listen Mode is a mode of a device in which no electromagnetic waves are output, electromagnetic waves of another device are received, load modulation is performed thereon, and data is transmitted. Here, operations of the NFC device in the Poll Mode and the Listen Mode will be described.

Figure 6:
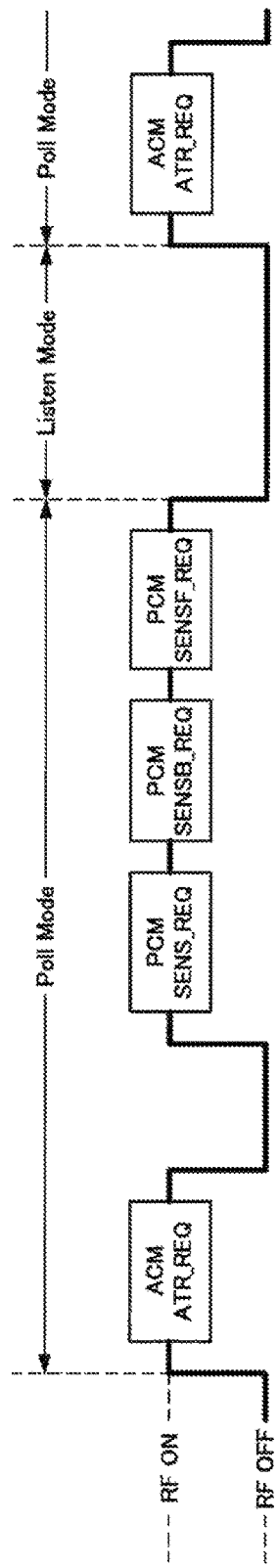
FIG. 6 is an explanatory diagram which shows an operation example of an NFC device in a Poll Mode and a Listen Mode.

FIG. 6 is an explanatory diagram which shows an operation example of the NFC device in the Poll Mode and the Listen Mode. In the example shown in FIG. 6, the NFC device is initially operated in the Poll Mode and generates an RF field (RF ON). After the RF field is generated, the NFC device transmits a Poll Command (ATR_REQ) in an active communication mode (ACM) and Poll Commands (SENS_REQ, SENSE_REQ, and SENSF_REQ) of three RF technologies in a passive communication mode (PCM). After the Poll Command is transmitted, the NFC device is operated in the Listen Mode and awaits an RF field and a Poll Command from a remote device. Then, after awaiting the RF field and the Poll Command from the remote device, the NFC device returns to the Poll Mode again. When there is a response from an NFC device (a target) of a partner for each of the Poll Commands, the NFC device establishes a connection of near field wireless communication in a communication mode corresponding to the response.

The NFCC 120 of the communication apparatus 100 transmits commands shown in FIG. 6 to the device (the communication apparatus 200) of the partner through near field wireless communication.

When the NFC device of the partner supports the active communication mode and the passive communication mode, the NFC device of the partner also transmits the commands shown in FIG. 6 in the same sequence. Therefore, during a period for which the NFC device of the partner operates in the Listen Mode, when the Poll Command (ATR_REQ) in the active communication mode is transmitted, the NFC device of the partner provides a response to ATR_REQ, and a connection of near field wireless communication in the active communication mode is established. When the operation is performed according to the sequence shown in FIG. 6, a connection of near field wireless communication in the active communication mode is highly likely to be established between the NFC devices. In the present embodiment, when the communication apparatuses 100 and 200, which are the NFC devices, establish a connection of near field wireless communication in the active communication mode, the information about a service that uses the passive communication mode is exchanged through near field wireless communication. When the communication apparatuses 100 and 200 establish a connection of near field wireless communication in the active communication mode, the information about a service that uses the passive communication mode is exchanged through near field wireless communication. Therefore, it is possible to exchange information about not only a service that uses the active communication mode but also a service that uses the passive communication mode.

Figure 7:
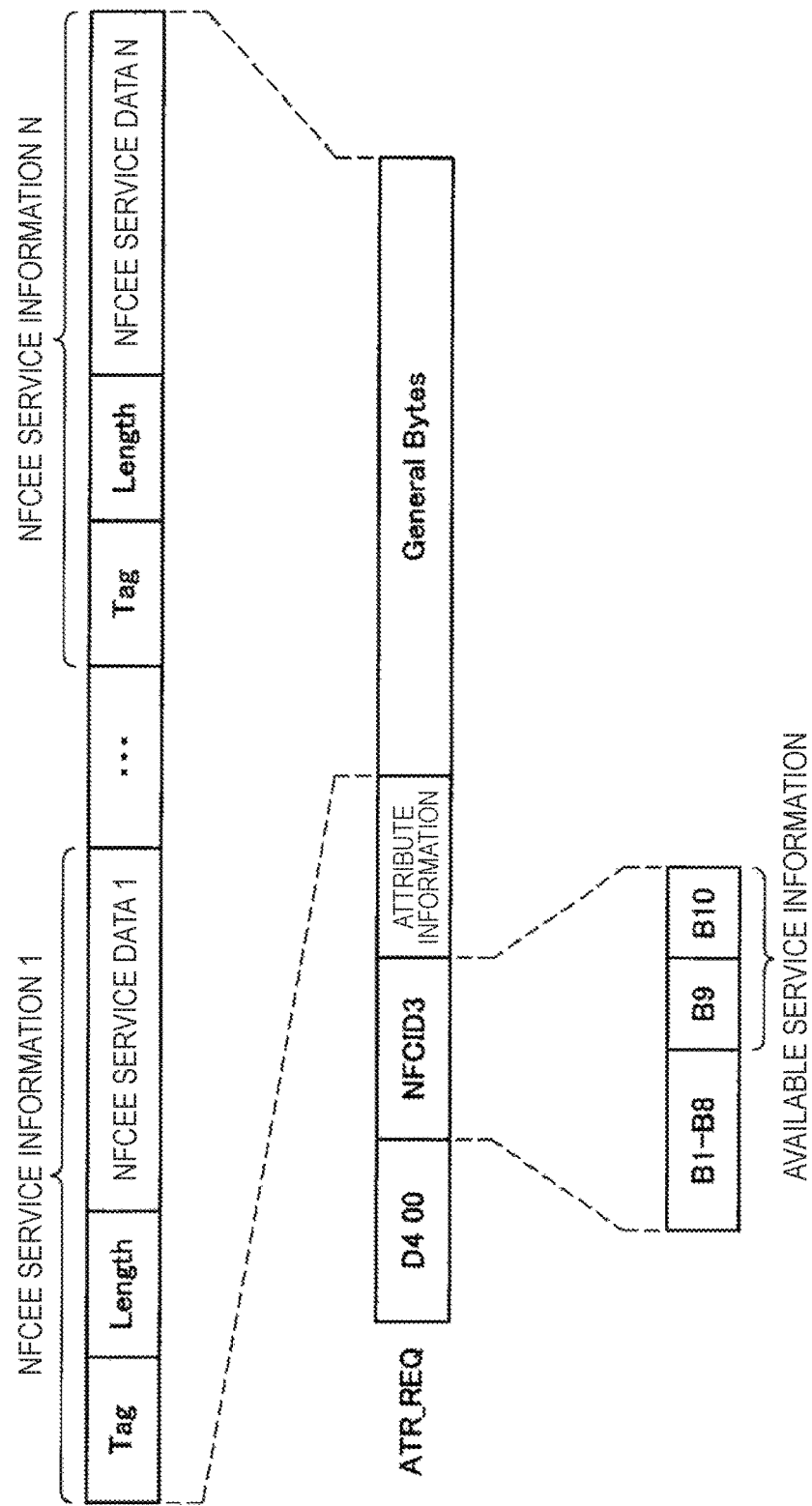
FIG. 7 is an explanatory diagram which shows a format of a Poll Command (ATR_REQ) in an active communication mode (ACM).
Figure 8:
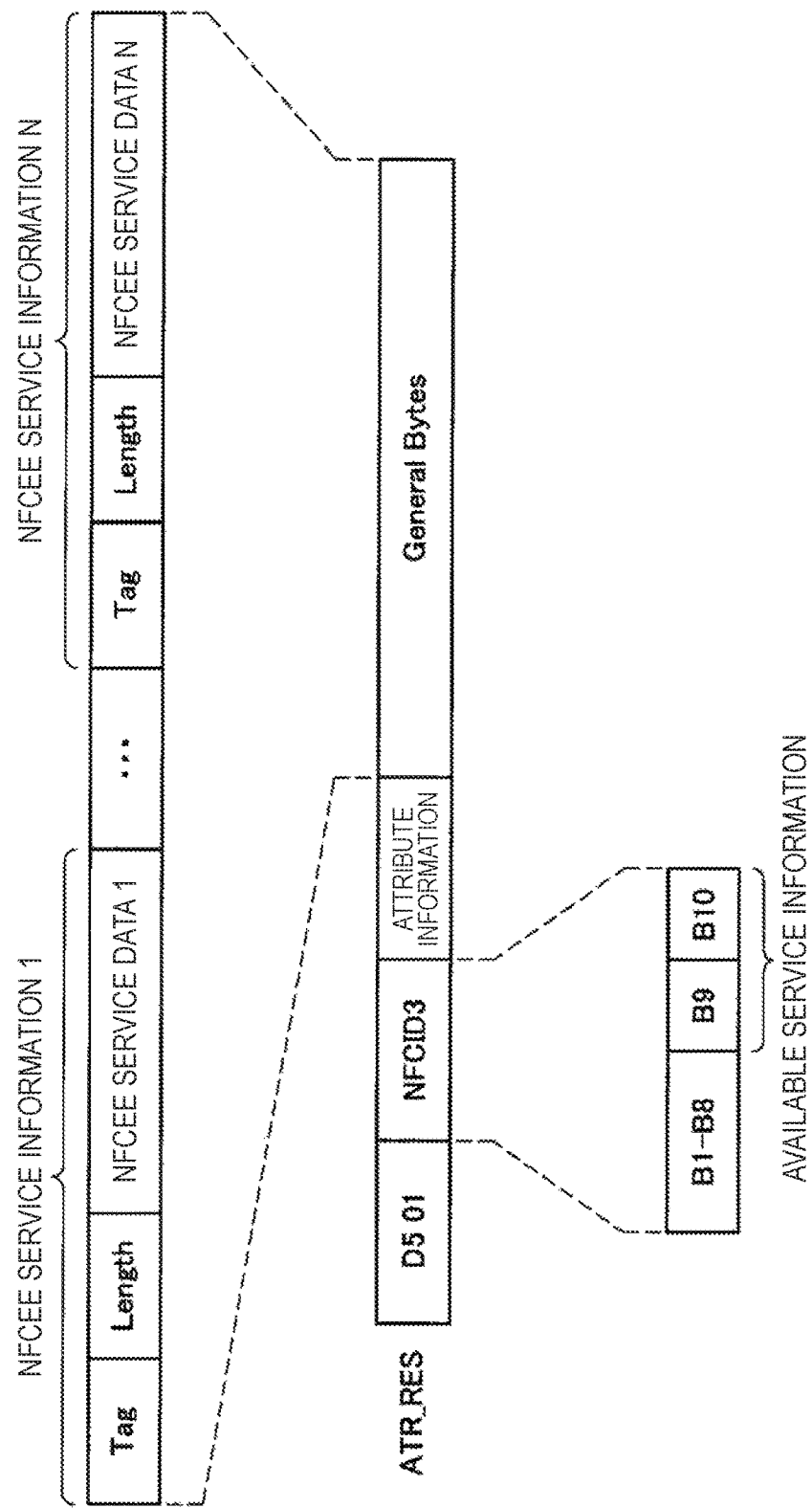
FIG. 8 is an explanatory diagram which shows a format of a response (ATR_RES) of ATR_REQ.
Figure 9:
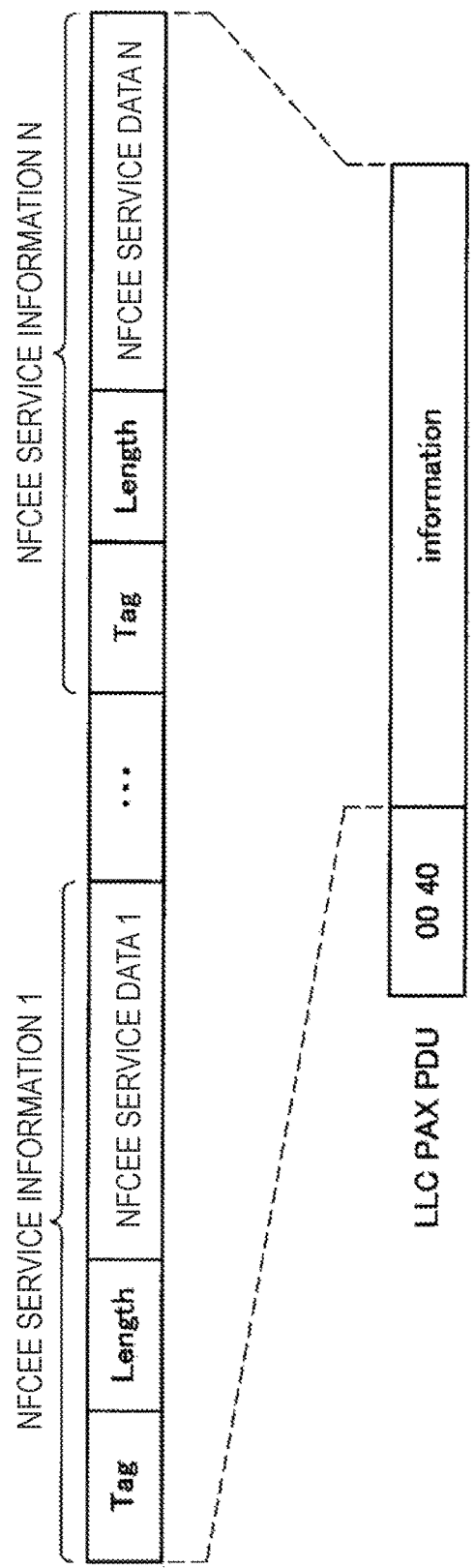
FIG. 9 is an explanatory diagram which shows a format of LLC PAX PDU.

FIG. 7 is an explanatory diagram which shows a format of a Poll Command (ATR_REQ) in the active communication mode (ACM). FIG. 8 is an explanatory diagram which shows a format of a response (ATR_RES) of ATR_REQ. FIG. 9 is an explanatory diagram which shows a format of LLC PAX PDU.

ATR_REQ shown in FIG. 7 is a command that is transmitted from the initiator to the target. ATR_RES is a command that is transmitted from the target to the initiator as a response for ATR_REQ. Both ATR_REQ and ATR_RES include NFCID3, attribute information, and General Bytes. A random number generated in a transmission device is stored in NFCID3. A transmission bit rate, a reception bit rate and the like are stored in the attribute information. Information about a protocol or a service implemented in the transmission device is stored in the General Bytes. In the present embodiment, NFCEE service information is stored in the General Bytes as information about a protocol or a service implemented in the transmission device. As shown in FIG. 7 and FIG. 8, NFCEE service information includes a combination of Tag (1 byte), Length (1 byte), and NFCEE service data (n bytes). Also, at least one piece of NFCEE service information is stored in the General Bytes.

LLC PAX PDU is stored in a Payload of DEP_REQ and DEP_RES Information PDU. The NFC device may store NFCEE service information in Information of LLC PAX PDU.

Then, the communication apparatus 100 according to the present embodiment stores NFCEE service information inside a device in the LLC PAX PDU, and provides NFCEE service information inside a device from the initiator to the target or from the target to the initiator. Further, when the communication apparatus 100 according to the present embodiment transmits ATR_REQ and ATR_RES, available service information is also stored in NFCID3.

The NFCC 120 of the communication apparatus 100 stores values in fields of commands shown in FIG. 7 according to an instruction of DH130. Then, the NFCC 120 transmits the commands having fields in which values are stored to the device (the communication apparatus 200) of the partner through near field wireless communication.

Fields of formats shown in FIGS. 7 to 9 are defined in detail in "Logical Link Control Protocol Technical Specification" of NFC Forum.

The communication apparatus 100 according to the present embodiment can store available service information in a position of a predetermined byte of NFCID3 (10 bytes in length). In the present embodiment, the available service information is stored in a ninth byte and a tenth byte of NFCID3, but the present disclosure is not limited thereto. The available service information is not information for identifying a specific service, but is information indicating which protocol an available service uses. When information through which it is possible to identify a service is included in NFCID3, an information field is consumed to that extent. On the other hand, in order to start a service, a minimum of protocol information used in the service may be provided. The available service information stored in NFCID3 provides minimum necessary information.

FIG. 10 is an explanatory diagram which shows an example of encoding of a ninth byte of NFCID3. In addition, FIG. 11 is an explanatory diagram which shows an example of encoding of a tenth byte of NFCID3. As shown in FIG. 11, the tenth byte of NFCID3 is a byte for reservation.

For example, in the example of encoding shown in FIG. 10, "service of NFC-DEP is available on NFC-A" in which an eighth bit is "1" indicates that a service that uses the NFC-DEP protocol according to which communication is performed on NFC-A in the passive communication mode is available, it is possible to respond to the Poll Command of the NFC-A technology, and it is possible to activate the NFC-DEP protocol.

The NFCC 120 may set a plurality of bits of the ninth byte of NFCID3 to "1." When a plurality of bits of the ninth byte of NFCID3 are set to "1," the device host 130 can show a plurality of available services to the partner.

In addition, as shown in FIGS. 7 to 9, the device host 130 can store at least one piece of NFCEE service information in General Bytes of ATR_REQ and ATR_RES or LLC PAX PDU. NFCEE service information includes a combination of Tag (1 byte), Length (1 byte), and NFCEE service data (n bytes). The Tag has a value for identifying information about a service in the NFCEE inside a device. The Length indicates a length n of NFCEE service data. In the NFCEE service data, a Well-Known service list defined in NFC Forum, a system code defined in JIS X 6319-4, AID defined in ISO/IEC 7816-4, and the like are stored. The NFC Forum Well-Known service list is defined in "Logical Link Control Protocol Technical Specification" of NFC Forum, and is a list indicating whether a Peer-to-Peer service that uses LLCP in the active communication mode and the passive communication mode is available.

FIG. 12 is an explanatory diagram which shows an example of NFCEE service information stored in General Bytes of ATR_REQ and ATR_RES or LLC PAX PDU. In the example shown in FIG. 12, when a Tag field has a value of "03," it indicates that the Well-Known service list is stored as NFCEE service data and a length thereof is 2 bytes. Similarly, when a Tag field has a value of "10," it indicates that AID defined in ISO/IEC 7816-4 is stored as NFCEE service data, and a length thereof is 5 to 16 bytes. When a Tag field has a value of "11," it indicates that a system code defined in JIS X 6319-4 as NFCEE service data is stored and a length thereof is 2 bytes.

Figure 13:
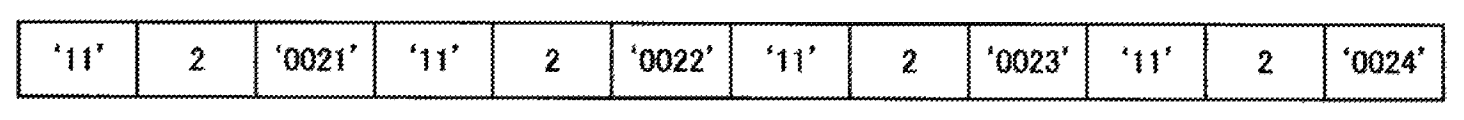

For example, when four system codes are registered in the NFCEE 140b of FIG. 5, values, for example, shown in FIG. 13, are stored in NFCEE service information. FIG. 13 shows an example in which four Well-Known service lists are stored in NFCEE service information. FIG. 13 shows the presence of four sets of NFCEE service information in which a Tag field has a value of "03," and a Len field has a value of 2. FIG. 13 shows that the Well-Known service lists have a value of "0021," "0022," "0023," and "0024."

The functional configuration example of the communication apparatus 100 according to an embodiment of the present disclosure has been described above. Next, an operation example of the near field wireless communication system 1 according to an embodiment of the present disclosure will be described.

[1.3. System Operation Example]

The near field wireless communication system 1 according to an embodiment of the present disclosure operates according to the following processing sequence when near field wireless communication is performed between the two communication apparatuses 100 and 200.
(1) Initializing process
(2) NFCEE service information exchange process inside device
(3) Service selection process
(Configuration Shown in FIG. 2)

Figure 14:
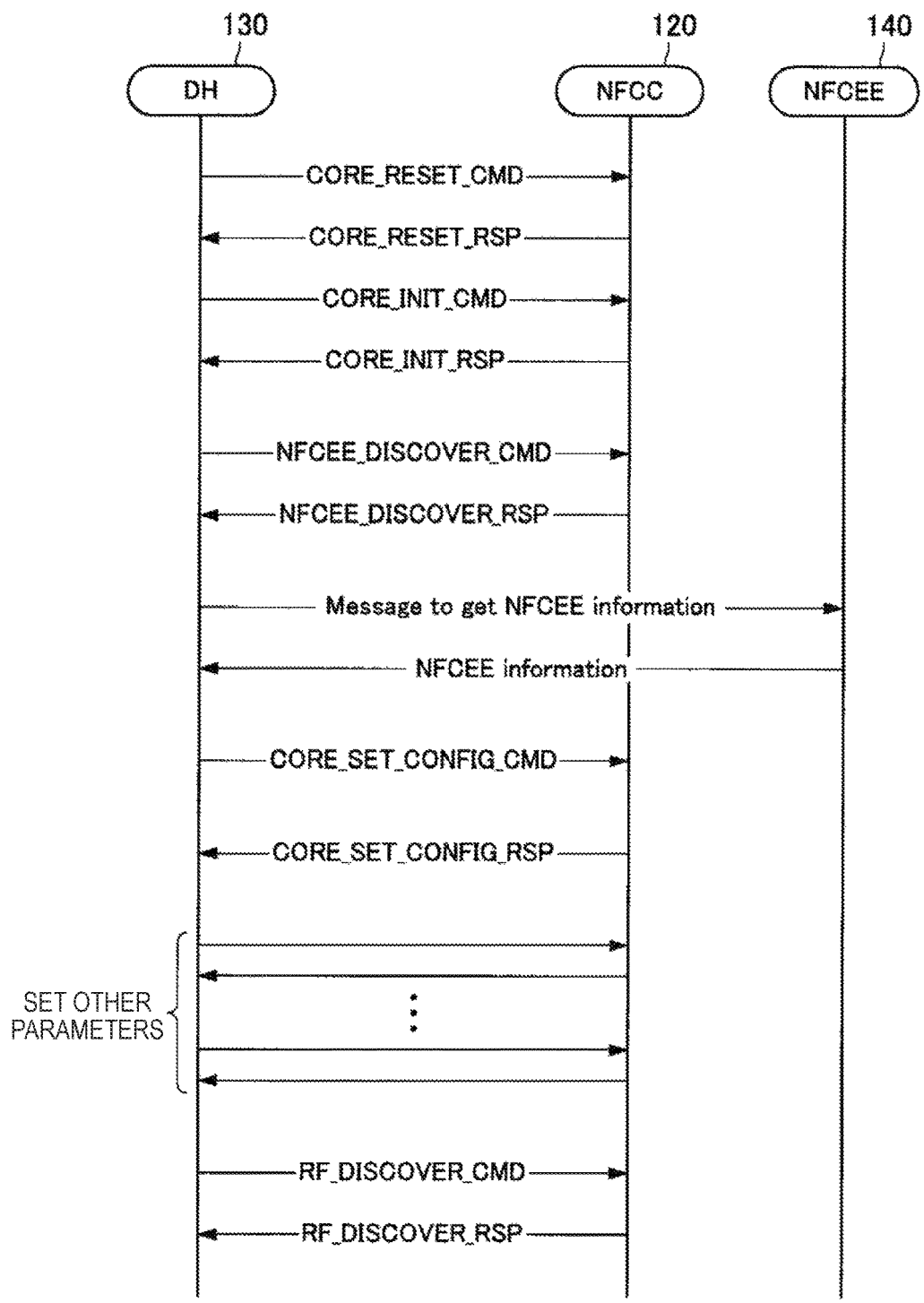
FIG. 14 is a sequence diagram which shows an operation example of the communication apparatus 100 according to an embodiment of the present disclosure.

First, an initializing process will be described. FIG. 14 is a sequence diagram which shows an operation example of the communication apparatus 100 according to an embodiment of the present disclosure. FIG. 14 shows an example of an initializing process of the communication apparatus 100 according to an embodiment of the present disclosure shown in FIG. 2. Hereinafter, the operation example of the communication apparatus 100 according to an embodiment of the present disclosure will be described with reference to FIG. 14.

As the initializing process, the communication apparatus 100 performs initialization of an interface between the device host 130 and the NFCC 120, search on NFCEE, acquisition of information from NFCEE, storage of information in NFCC, setting of other parameters and start of TDA in that order.

When the interface between the device host 130 and the NFCC 120 in the communication apparatus 100 is initialized, first, the device host 130 transmits a command CORE_RESET_CMD for instructing reset to the NFCC 120, and the NFCC 120 transmits CORE_RESET_RSP, which is a response for the CORE_RESET_CMD, to the device host 130. Next, the device host 130 transmits an initialization command CORE_INIT_CMD to the NFCC 120, and the NFCC 120 transmits CORE_INIT_RSP, which is a response for the CORE_INIT_CMD, to the device host 130. Commands transmitted between the device host 130 and the NFCC 120 when initialization is performed are defined in detail in "NFC Controller Interface Technical Specification" of NFC Forum.

When the initialization of the interface between the device host 130 and the NFCC 120 is completed, the communication apparatus 100 then performs search on NFCEE. When search on NFCEE is performed, the device host 130 transmits a command NFCEE_DISCOVER_CMD for search on NFCEE to the NFCC 120. The NFCC 120 transmits NFCEE_DISCOVER_RSP, which is a response for the NFCEE_DISCOVER_CMD, to the device host 130. Commands transmitted between the device host 130 and the NFCC 120 when search on NFCEE is performed are defined in detail in "NFC Controller Interface Technical Specification" of NFC Forum.

When search on NFCEE is completed, the communication apparatus 100 then performs acquisition of information from NFCEE found from a search result. In the communication apparatus 100 shown in FIG. 2, the NFCEE 140 is directly connected to the device host 130. Therefore, the device host 130 can directly ask the NFCEE 140 for NFCEE information (Message to get NECEE information). Acquisition of information of the NFCEE 140 by the device host 130 can be performed by transmitting and receiving a message having any format. The NFCEE 140 returns information of the NFCEE 140 to the device host 130 according to the inquiry from the device host 130 (NECEE information).

When the device host 130 acquires information from the NFCEE 140, the communication apparatus 100 stores then NFCEE information acquired by the device host 130 in the NFCC 120. The device host 130 uses a command CORE_SET_CONFIG_CMD in order to store information of NFCEE in the NFCC 120. The CORE_SET_CONFIG_CMD is a command for setting values of parameters that include an identifier Tag, a length Len and a value Value. When available service information is set, the device host 130 stores, for example, data shown in FIG. 15, in PN_ATR_REQ_NFCID3 or LN_ATR_RES_NFCID3 in order to set NFCID3. "XX" indicates any value. A value of information such as a protocol that a service in the NFCEE 140 uses is stored in the available service information. When the device host 130 transmits the command CORE_SET_CONFIG_CMD to the NFCC 120, the NFCC 120 returns a command CORE_SET_CONFIG_RSP to the device host 130.

When NFCEE service information is set, the device host 130 stores, for example, data shown in FIG. 16, in PN_ATR_REQ_GEN_BYTES or LN_ATR_RES_GEN_BYTES in order to set General Bytes.

In addition, the device host 130 sets LF_T3T_PARAMETERS_1 as in FIG. 17, and causes the NFCC 120 to be able to process SENSF_REQ including a system code "0011."

When the NFCEE information acquired by the device host 130 is stored in the NFCC 120 and the NFCC 120 returns the command CORE_SET_CONFIG_RSP to the device host 130, the communication apparatus 100 then performs setting of the other parameters between the NFCC 120 and the device host 130 as necessary, and then starts TDA. When start of TDA is performed, the device host 130 transmits a command RF_DISCOVER_CMD to the NFCC 120. The NFCC 120 transmits RF_DISCOVER_RSP, which is a response for the RF_DISCOVER_CMD, to the device host 130.

When the communication apparatus 100 according to an embodiment of the present disclosure shown in FIG. 2 performs a series of operations shown in FIG. 14, it is possible to store information of the NFCEE 140, that is, protocol information and service identification information maintained in the NFCEE 140, in the NFCC 120. Then, the NFCC 120 acquires information of the NFCEE 140 in the initializing process. Therefore, when a connection of near field wireless communication is established in the active communication mode with the communication apparatus 200, it is possible to transmit the information about a service that uses the passive communication mode to the communication apparatus 200.

Next, an exchange process and a service selection process of NFCEE service information inside the NFC device will be described. FIG. 18 is a sequence diagram which shows an operation example of the communication apparatus 100 according to an embodiment of the present disclosure. FIG. 18 shows an example of an exchange process and a service selection process of NFCEE service information inside the NFC device in the communication apparatus 100 according to an embodiment of the present disclosure shown in FIG. 2. Hereinafter, the operation example of the communication apparatus 100 according to an embodiment of the present disclosure will be described with reference to FIG. 18.

The communication apparatus 100 receives a command ATR_REQ in the active communication mode (ACM) transmitted from the communication apparatus 200, and the communication apparatus 100 responds with a command ATR_RES of ACM to the communication apparatus 200. Reception of the command from the communication apparatus 200 and response using the command are performed by the NFCC 120. At least one set of NFCEE service information obtained by collecting data from the NFCEE 140 according to the above initializing process is included in the ATR_REQ and ATR_RES. Accordingly, when the communication apparatus 100 exchanges the ATR_REQ and ATR_RES including NFCEE service information with the communication apparatus 200, a connection of near field wireless communication is established in the active communication mode (ACM) with the communication apparatus 200. Therefore, when the communication apparatus 100 exchanges the ATR_REQ and ATR_RES with the communication apparatus 200, information about a service that the communication apparatus 100 can execute is provided to the communication apparatus 200, and information about a service that the communication apparatus 200 can execute can be acquired.

The communication apparatus 100 exchanges the ATR_REQ and ATR_RES with the communication apparatus 200, and then performs data exchange using DEP_REQ and DEP_RES.

Then, the communication apparatus 100 selects a service to be started based on information about a service acquired from the communication apparatus 200. This example shows that start of a service of a system code SC11 is selected by the user.

In order to establish a connection of near field wireless communication in the passive communication mode with the communication apparatus 200, the communication apparatus 100 temporarily releases a connection of near field wireless communication with the communication apparatus 200 which was established in the active communication mode by exchanging the ATR_REQ and ATR_RES. That is, since a connection (ACM link) of near field wireless communication in the active communication mode is activated by exchanging the ATR_REQ and ATR_RES, the communication apparatus 100 deactivates the ACM link by exchanging RLS_REQ and RLS_RES with the communication apparatus 200. Therefore, the communication apparatus 200 transmits SENSF_REQ including the system code SC11 to the communication apparatus 100 in order to select a service.

When the SENSF_REQ including the system code SC11 is received, the communication apparatus 100 transmits SENSF_RES including NFCID2_11 to the communication apparatus 200. The communication apparatus 200 transmits CHECK-C(CHECK command of Type 3 Tag Operation) to the communication apparatus 100 using the NFCID2_11 received from the communication apparatus 100.

When the CHECK-C is received, the communication apparatus 100 performs evaluation of NFCID2-based Routing in the NFCC 120, and transmits the received CHECK-C from the NFCC 120 to the device host 130. In the present embodiment, since AID is included in the NFCEE 140, the communication apparatus 100 may select a service with a SELECT AID command instead of receiving SENSF_REQ from the communication apparatus 200. For example, in the case of NFC-A, commands are transmitted and received between the communication apparatus 200 and the communication apparatus 100 in the order of SENS_REQ/RES, SDD_REQ/RES, SEL_REQ/RES, RATS/ATS, and SELECT AID, and therefore a service in the NFCEE 140 may be selected.

When the CHECK-C is received from the NFCC 120, the device host 130 transmits CHECK-R to the NFCC 120. The NFCC 120 transmits the CHECK-R received from the device host 130 to the communication apparatus 200.

The communication apparatuses 100 and 200 according to an embodiment of the present disclosure perform the above operation. Therefore, when a response is returned to the initiator (the communication apparatus 200) in the active communication mode and a connection of near field wireless communication is established with the initiator, it is possible for the initiator (the communication apparatus 200) to recognize all services available in the active communication mode and the passive communication mode.

The above operation example shows a case in which the NFCEE 140 is connected to the device host 130 as in FIG. 2. Hereinafter, an operation example in which there is NFCEE (the NFCEEs 140b and 140c) that is not directly connected to the device host 130 as in FIG. 4 will be described.

(Configuration Shown in FIG. 4, Case 1)

Figure 19B:
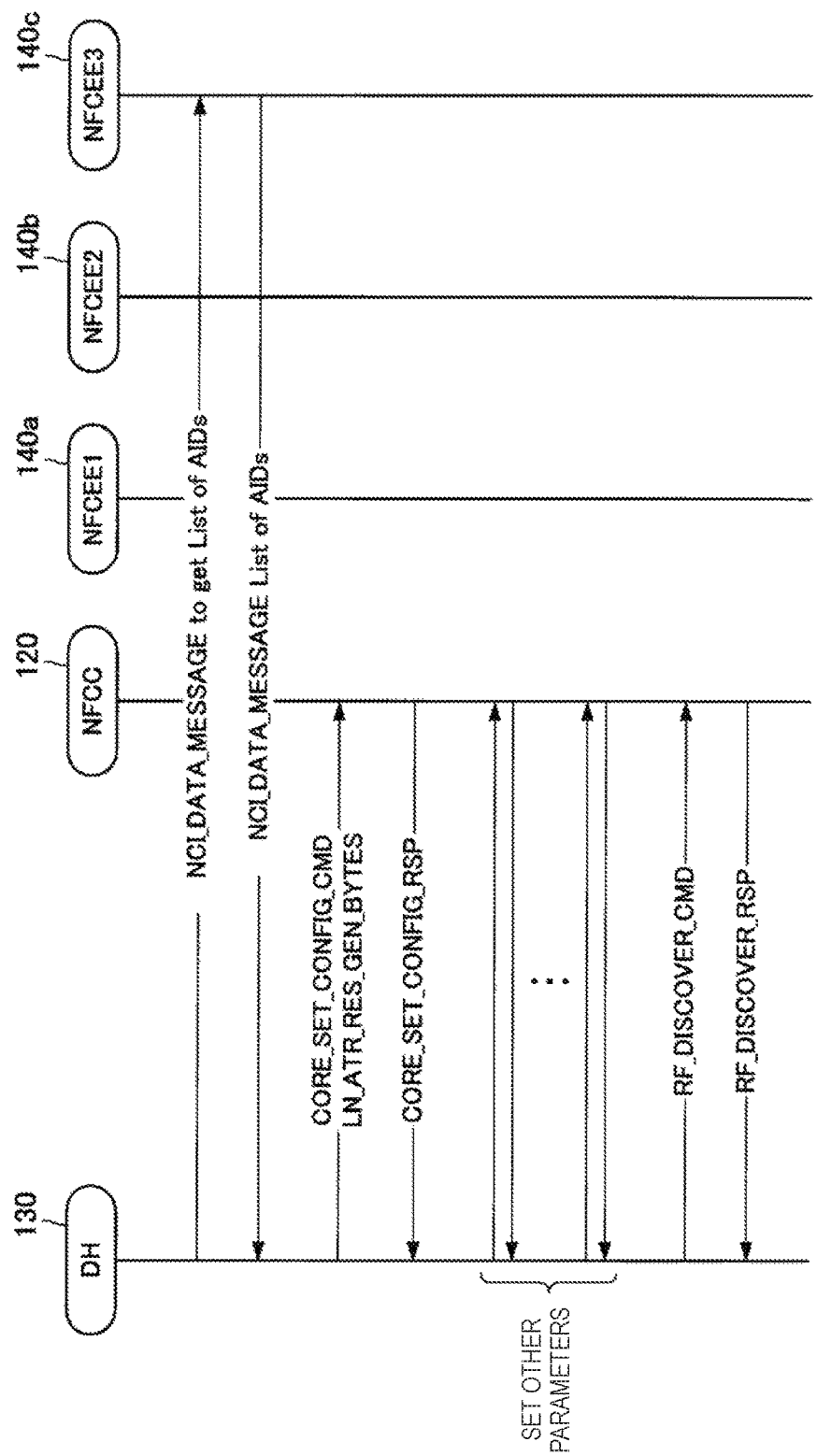
FIG. 19B is a sequence diagram which shows an operation example of the communication apparatus 100 according to an embodiment of the present disclosure.

First, the initializing process will be described. FIG. 19A and FIG. 19B are sequence diagrams which show operation examples of the communication apparatus 100 according to an embodiment of the present disclosure. FIG. 19A and FIG. 19B show examples of the initializing process in the communication apparatus 100 according to an embodiment of the present disclosure shown in FIG. 4. In the sequence diagrams shown in FIG. 19A and FIG. 19B, the NFCEE 140a is denoted as "NFCEE1," the NFCEE 140b is denoted as "NFCEE2," and the NFCEE 140c is denoted as "NFCEE3." Hereinafter, operation examples of the communication apparatus 100 according to an embodiment of the present disclosure will be described with reference to FIG. 19A and FIG. 19B.

As the initializing process, the communication apparatus 100 performs initialization of the interface between the device host 130 and the NFCC 120, search on NFCEE, acquisition of information from NFCEE, storage of information in NFCC, setting of other parameters and start of TDA in that order.

Similarly to the operation example described using the flowchart shown in FIG. 14, when the interface between the device host 130 and the NFCC 120 is initialized in the communication apparatus 100, first, the device host 130 transmits a command CORE_RESET_CMD for instructing reset to the NFCC 120. The NFCC 120 transmits CORE_RESET_RSP, which is a response for CORE_RESET_CMD, to the device host 130. Next, the device host 130 transmits an initialization command CORE_IN- IT_CMD to the NFCC 120, and the NFCC 120 transmits CORE_INIT_RSP, which is a response for CORE_INIT_CMD, to the device host 130.

When the initialization of the interface between the device host 130 and the NFCC 120 is completed, the communication apparatus 100 then performs search on NFCEE similarly to the operation example described using the flowchart shown in FIG. 14. When search on NFCEE is performed, the device host 130 transmits a command NFCEE_DISCOVER_CMD for search on NFCEE to the NFCC 120. The NFCC 120 transmits NFCEE_DISCOVER_RSP, which is a response for NFCEE_DISCOVER_CMD, to the device host 130.

When search on NFCEE is completed, the communication apparatus 100 then performs acquisition of information from NFCEE found from a search result. In the communication apparatus 100 shown in FIG. 4, the NFCEE 140*a* is directly connected to the device host 130, and when the NFCEEs 140*b* and 140*c* are connected to the NFCC 120. Therefore, the device host 130 can directly ask the NFCEE 140*a* for NFCEE information. Acquisition of information of the NFCEE 140*a* by the device host 130 can be performed by transmitting and receiving a message having any format.

In addition, the device host 130 acquires information of the NFCEEs 140*b* and 140*c* acquired by the NFCC 120 from the NFCC 120. When NFCEE_DISCOVER_CMD is transmitted to the NFCC 120, the device host 130 can acquire information of the NFCEEs 140*b* and 140*c* from the NFCC 120. The NFCC 120 transmits information of the NFCEEs 140*b* and 140*c* to the device host 130 using a command NFCEE_DISCOVER_NTF.

When Type 3 Tag Emulation is implemented in NFCEE, the device host 130 extracts a system code stored in NFCEE_ DISCOVER_NTF and is maintained as NFCEE service information. In addition, the device host 130 acquires information from the NFCEEs 140*a*, 140*b*, and 140*c* using AID and is maintained as NFCEE service information. In FIG. 19B, the device host 130 tries to acquire AID (NCI_DATA_MESSAGE to get List of AIDs) from the NFCEE 140*c*, and the NFCEE 140*c* returns AID to the device host 130 (NCI_DATA_MESSAGE List of AIDs).

When the device host 130 acquires information from the NFCEEs 140*a*, 140*b*, and 140*c*, the communication apparatus 100 then stores information of the NFCEEs 140*a*, 140*b*, and 140*c* acquired by the device host 130 in the NFCC 120. The device host 130 uses a command CORE_SET_CONFIG_CMD to store information of the NFCEEs 140*a*, 140*b*, and 140*c* in the NFCC 120. Therefore, when the device host 130 transmits the command CORE_SET_CONFIG_CMD to the NFCC 120, the NFCC 120 returns a command CORE_SET_CONFIG_RSP to the device host 130.

Figure 15:
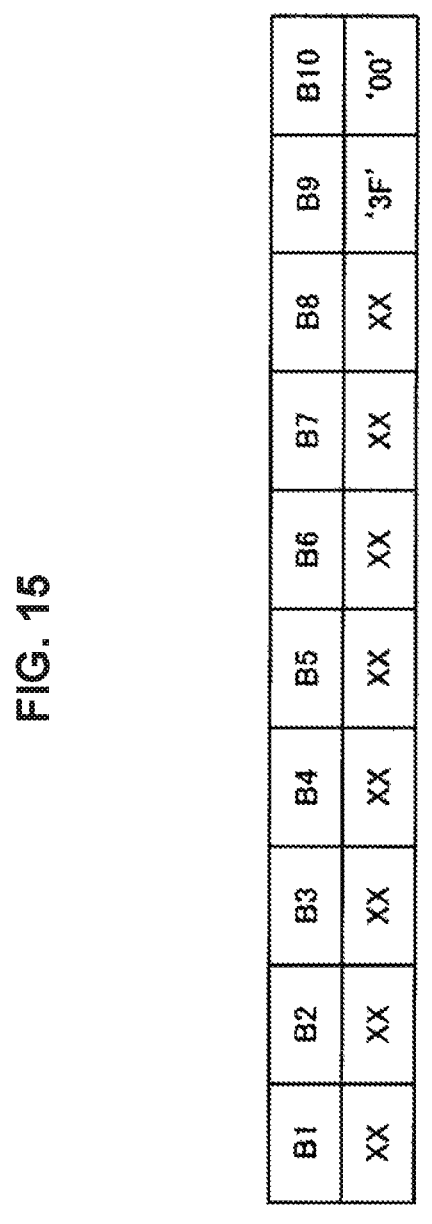

When available service information is set, the device host 130 stores, for example, data shown in FIG. 15, in PN_ATR_REQ_NFCID3 or LN_ATR_RES_NFCID3 in order to set NFCID3. "XX" indicates any value. A value obtained by integrating information of a protocol that a service uses in all NFCEEs is stored in the available service information.

When NFCEE service information is set, the device host 130 stores, for example, data shown in FIG. 20, in PN_ATR_REQ_GEN_BYTES or LN_ATR_RES_GEN_BYTES in order to set General Bytes. In addition, the device host 130 sets LF_T3T_PARAMETERS_1 as in FIG. 21, and causes the NFCC 120 to be able to process SENSF_REQ including a system code of "0011." Since a system code of the NFCEE 140*b* can be processed by the NFCEE 140*b*, the device host 130 does not add the system code of the NFCEE 140*b* when setting parameters of the NFCC 120.

When the communication apparatus 100 according to an embodiment of the present disclosure shown in FIG. 4 performs a series of operations shown in FIG. 14, it is possible to store information of the NFCEE 140, that is, protocol information and service identification information maintained in the NFCEE 140 in the NFCC 120.

Figure 22:
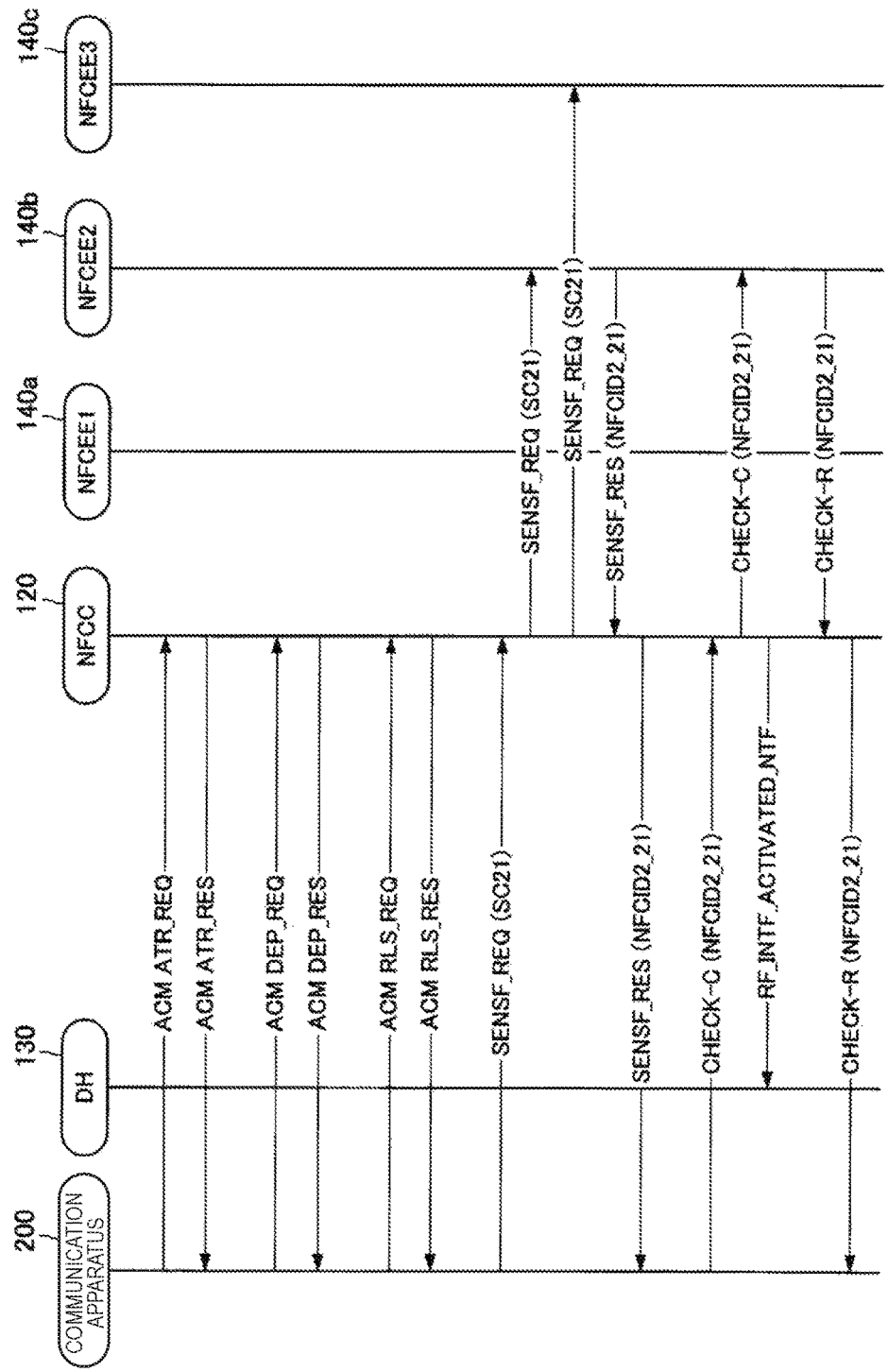
FIG. 22 is a sequence diagram which shows an operation example of the communication apparatus 100 according to an embodiment of the present disclosure.

Next, an exchange process and a service selection process of NFCEE service information inside a device will be described. FIG. 22 is a sequence diagram which shows an operation example of the communication apparatus 100 according to an embodiment of the present disclosure. FIG. 22 shows an example of an exchange process and a service selection process of NFCEE service information inside a device in the communication apparatus 100 according to an embodiment of the present disclosure shown in FIG. 4. Hereinafter, the operation example of the communication apparatus 100 according to an embodiment of the present disclosure will be described with reference to FIG. 22.

The communication apparatus 100 receives a command ATR_REQ in the active communication mode (ACM) transmitted from the communication apparatus 200. The communication apparatus 100 responds with a command ATR_RES of ACM to the communication apparatus 200. Reception of the command from the communication apparatus 200 and response using the command are performed by the NFCC 120. When the communication apparatus 100 exchanges the ATR_REQ and ATR_RES with the communication apparatus 200, a connection of near field wireless communication with the communication apparatus 200 is established in the active communication mode (ACM). Therefore, when the communication apparatus 100 exchanges the ATR_REQ and ATR_RES with the communication apparatus 200, information about a service that the communication apparatus 100 can execute is provided to the communication apparatus 200, and information about a service that the communication apparatus 200 can execute can be acquired.

The communication apparatus 100 exchanges the ATR_REQ and ATR_RES with the communication apparatus 200, and then performs data exchange using DEP_REQ and DEP_RES.

Therefore, the communication apparatus 100 selects a service to be started based on the information about a service acquired from the communication apparatus 200. This example shows that start of a service of a system code SC21 is selected by the user.

Since the ACM link is activated by exchanging the ATR_REQ and ATR_RES, the communication apparatus 100 deactivates the ACM link by exchanging RLS_REQ and RLS_RES with the communication apparatus 200. Therefore, the communication apparatus 200 transmits SENSF_REQ including the system code SC11 to the communication apparatus 100 in order to select a service.

When SENSF_REQ including the system code SC21 is received, the NFCC 120 of the communication apparatus 100 transmits SENSF_REQ including the system code SC21 to the NFCEEs 140*b* and 140*c*. Since a service including the system code SC21 is performed by the NFCEE 140*b*, only the NFCEE 140*b* transmits SENSF_RES including NFCID2_21, which is a response for SENSF_REQ including the system code SC21, to the NFCC 120. Therefore, when the SENSF_RES including NFCID2_21 is received from the NFCEE 140*b*, the NFCC 120 transmits SENSF_RES including NFCID2_21 to the communication apparatus 200.

The communication apparatus 200 transmits CHECK-C (CHECK command of Type 3 Tag Operation) to the communication apparatus 100 using NFCID2_21 received from the communication apparatus 100. When the CHECK-C is received, the communication apparatus 100 performs evaluation of NFCID2-based Routing in the NFCC 120 and transmits the received CHECK-C from the NFCC 120 to the NFCEE 140b. In addition, the NFCC 120 transmits a command RF_INTF_ACTIVATED_NTF to the device host 130.

When the CHECK-C is received from the NFCC 120, the NFCEE 140b transmits the CHECK-R to the NFCC 120, and the NFCC 120 transmits the CHECK-R received from the NFCEE 140b to the communication apparatus 200.

The communication apparatuses 100 and 200 according to an embodiment of the present disclosure perform the above operation. Therefore, when a response is returned to the initiator (the communication apparatus 200) in the active communication mode and a connection of near field wireless communication is established in the active communication mode with the initiator, it is possible for the initiator (the communication apparatus 200) to recognize all services available in the active communication mode and the passive communication mode.

(Configuration Shown in FIG. 4, Case 2)

In the above case 1, when the ATR_REQ and ATR_RES are exchanged between the communication apparatus 100 and the communication apparatus 200, service information of all of the NFCEEs 140a, 140b, and 140c is stored in ATR_RES. However, when the ATR_REQ and ATR_RES are exchanged between the communication apparatus 100 and the communication apparatus 200, even if only available service information is stored in ATR_RES, the initiator side can confirm whether a service is available in the passive communication mode (PCM) and a protocol that an available service uses.

Figure 23:
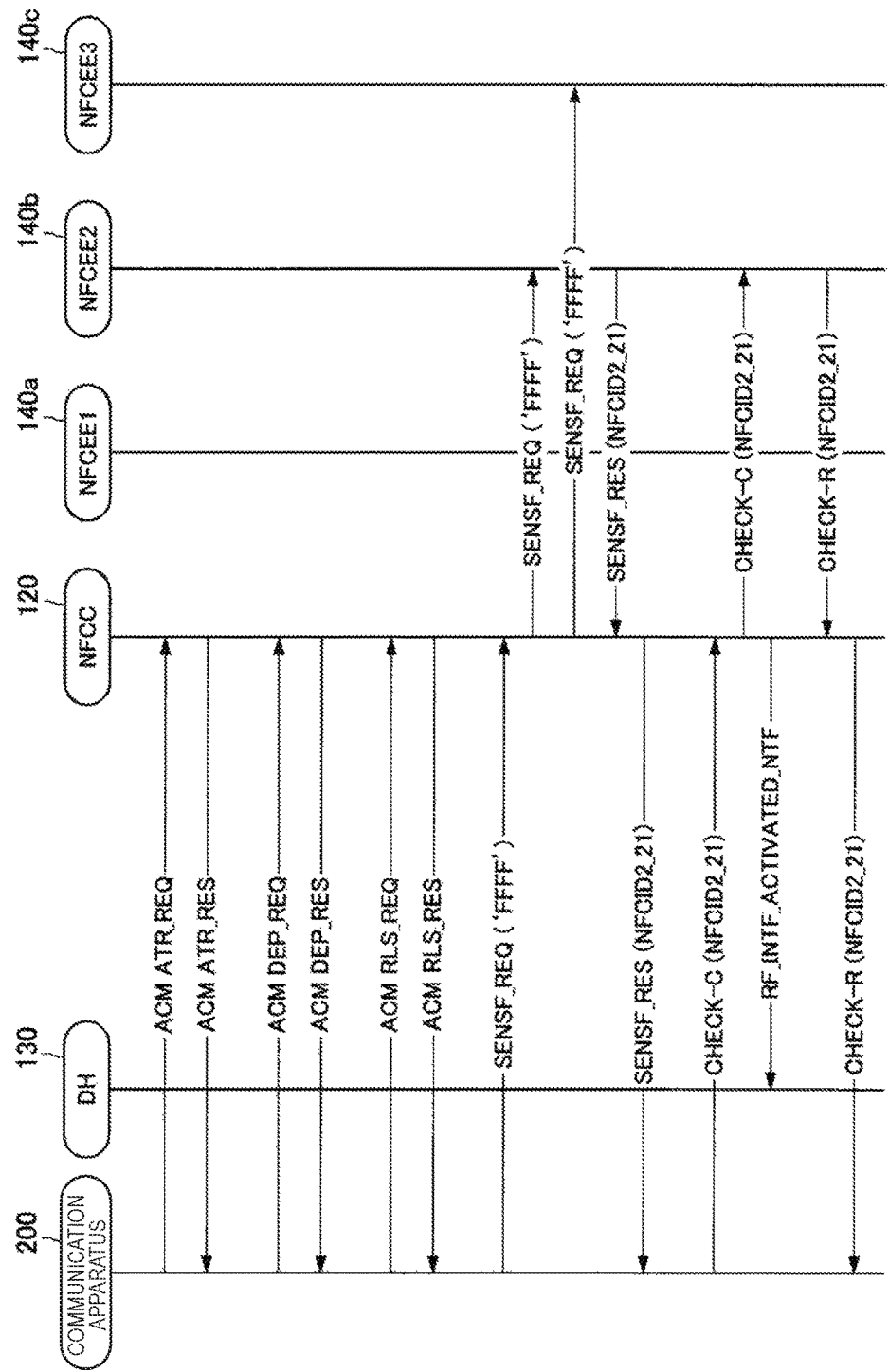
FIG. 23 is a sequence diagram which shows an operation example of the communication apparatus 100 according to an embodiment of the present disclosure.

FIG. 23 is a sequence diagram which shows an operation example of the communication apparatus 100 according to an embodiment of the present disclosure. FIG. 23 shows an example of an exchange process and a service selection process of NFCEE service information inside a device in the communication apparatus 100 according to an embodiment of the present disclosure shown in FIG. 4. Hereinafter, the operation example of the communication apparatus 100 according to an embodiment of the present disclosure will be described with reference to FIG. 23.

The communication apparatus 100 receives a command ATR_REQ in the active communication mode (ACM) transmitted from the communication apparatus 200. The communication apparatus 100 responds with a command ATR_RES of ACM to the communication apparatus 200. Reception of the command from the communication apparatus 200 and response using the command are performed by the NFCC 120. When the communication apparatus 100 exchanges the ATR_REQ and ATR_RES with the communication apparatus 200, a connection of near field wireless communication is established in the active communication mode (ACM) with the communication apparatus 200. Therefore, when the communication apparatus 200 exchanges the ATR_REQ and ATR_RES with the communication apparatus 100, it is possible to obtain available service information of the communication apparatus 100. That is, according to the exchange of the ATR_REQ and ATR_RES with the communication apparatus 100, the communication apparatus 200 can obtain information about a communication scheme and a protocol that are available in the communication apparatus 100.

The communication apparatus 100 exchanges the ATR_REQ and ATR_RES with the communication apparatus 200, and then performs data exchange using DEP_REQ and DEP_RES.

Then, the communication apparatus 200 selects a protocol based on the protocol information acquired from the communication apparatus 100. In the example shown in FIG. 23, a service of Type 3 Tag Platform (T3T) is selected by the user of the communication apparatus 200. Since the ACM link is activated by exchanging the ATR_REQ and ATR_RES, the communication apparatus 100 deactivates the ACM link by exchanging RLS_REQ and RLS_RES with the communication apparatus 200. Therefore, in a Poll Command of NFC-F corresponding to T3T, the communication apparatus 200 sets a system code designated by SENSF_REQ as a code that is not a specific code, for example, "FFFF," and transmits the code to the communication apparatus 100. When the communication apparatus 200 sets a system code designated by SENSF_REQ to, for example, "FFFF" and transmits the code to the communication apparatus 100, the communication apparatus 100 can respond with a service that uses T3T to the communication apparatus 200.

When SENSF_REQ including a system code of "FFFF" is received, the NFCC 120 of the communication apparatus 100 transmits the SENSF_REQ including the system code of "FFFF" to the NFCEEs 140b and 140c. Since a service that uses T3T is performed by the NFCEE 140b, only the NFCEE 140b transmits a response SENSF_RES for SENSF_REQ to the NFCC 120.

As shown in FIG. 5, system codes corresponding to a plurality of services that use T3T are stored in the NFCEE 140b. When a plurality of system codes are stored in the NFCEE 140b, the NFCEE 140b may select, for example, the system code of the head. In this case, when system codes shown in FIG. 5 are stored, the NFCEE 140b selects a system code SC21, and transmits SENSF_RES including NFCID2_21 to the NFCC 120. Therefore, when the SENSF_RES including NFCID2_21 is received from the NFCEE 140b, the NFCC 120 transmits the SENSF_RES including NFCID2_21 to the communication apparatus 200.

The operations thereafter are the same as in the above case 1. That is, the communication apparatus 200 transmits CHECK-C(CHECK command of Type 3 Tag Operation) to the communication apparatus 100 using the NFCID2_21 received from the communication apparatus 100. When the CHECK-C is received, the communication apparatus 100 performs evaluation of NFCID2-based Routing in the NFCC 120, and transmits the received CHECK-C from the NFCC 120 to the NFCEE 140b. In addition, the NFCC 120 transmits a command RF_INTF_ACTIVATED_NTF to the device host 130.

When the CHECK-C is received from the NFCC 120, the NFCEE 140b transmits the CHECK-R to the NFCC 120, and the NFCC 120 transmits the CHECK-R received from the NFCEE 140b to the communication apparatus 200.

The communication apparatuses 100 and 200 according to an embodiment of the present disclosure perform the above operation. Therefore, when a response is returned to the initiator (the communication apparatus 200) in the active communication mode and a connection of near field wireless communication is established in the active communication mode with the initiator, even if only available service information is exchanged, it is possible to start a service in the passive communication mode from the initiator to the target.

When a connection of near field wireless communication is established, since the communication apparatuses 100 and 200 according to an embodiment of the present disclosure exchange only available device information, an amount of information transmitted and received when a connection of near field wireless communication is established is smaller than that of the case 1. Therefore, the case 2 has an effect in which a time from when a connection of near field wireless communication is established until information is presented on a screen is shorter than that of the case 1. In addition, the case 2 has an effect in which a device (the communication apparatus 100) of the target side selects information after a connection of near field wireless communication is established, and delivers the information to a device (the communication apparatus 200) of the initiator side.

(Configuration Shown in FIG. 4, Case 3)

In the above case 2, when the ATR_REQ and ATR_RES are exchanged between the communication apparatus 100 and the communication apparatus 200, only available service information is stored in ATR_RES transmitted from the communication apparatus 100 in some cases. After an NFC-DEP protocol and an LLC protocol are activated in the active communication mode (ACM), the initiator can exchange service information using LLC PAX PDU as necessary.

Figure 24:
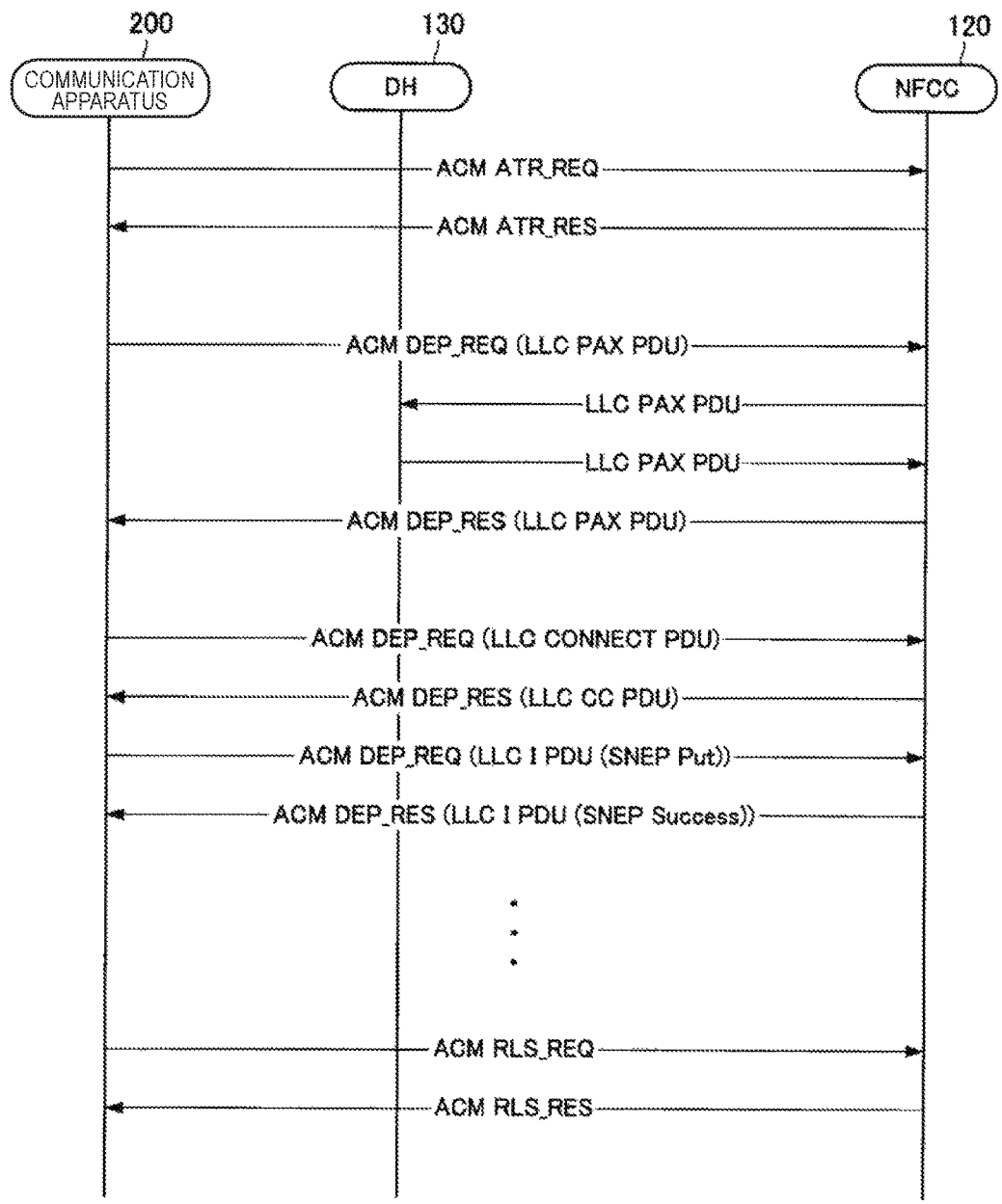
FIG. 24 is a sequence diagram which shows an operation example of the communication apparatus 100 according to an embodiment of the present disclosure.

FIG. 24 is a sequence diagram which shows an operation example of the communication apparatus 100 according to an embodiment of the present disclosure. FIG. 24 shows an example of an exchange process and a service selection process of NFCEE service information inside a device in the communication apparatus 100 according to an embodiment of the present disclosure shown in FIG. 4. Hereinafter, the operation example of the communication apparatus 100 according to an embodiment of the present disclosure will be described with reference to FIG. 24.

The communication apparatus 100 receives a command ATR_REQ of the active communication mode (ACM) transmitted from the communication apparatus 200, and the communication apparatus 100 responds with a command ATR_RES of ACM to the communication apparatus 200. Reception of the command from the communication apparatus 200 and response using the command are performed by the NFCC 120.

When the communication apparatus 100 exchanges the ATR_REQ and ATR_RES with the communication apparatus 200, a connection of near field wireless communication is established in the active communication mode (ACM) with the communication apparatus 200. Therefore, when the communication apparatus 200 exchanges the ATR_REQ and ATR_RES with the communication apparatus 100, it is possible to obtain available service information of the communication apparatus 100. That is, according to the exchange of the ATR_REQ and ATR_RES with the communication apparatus 100, the communication apparatus 200 can obtain information about a communication scheme and a protocol that are available in the communication apparatus 100.

The communication apparatus 100 exchanges the ATR_REQ and ATR_RES with the communication apparatus 200, and then exchanges service information using LLC PAX PDU. LLC PAX PDU is exchanged using DEP_REQ and DEP_RES. As shown in FIG. 9, the communication apparatus 100 stores NFCEE service information in Information of LLC PAX PDU and transmits the information to the communication apparatus 200.

In addition, in the example shown in FIG. 24, the user of the communication apparatus 200 selects an SNEP service (a service defined in NFC Forum Simple NDEF Exchange Protocol Technical Specification) that uses an ACM LLC protocol. Therefore, unlike the above cases, the communication apparatuses 100 and 200 maintain the ACM link without change and perform data exchange of the SNEP service. In the example shown in FIG. 24, according to exchange of a command DEP_REQ/RES of ACM, data exchange is performed between the communication apparatuses 100 and 200.

Accordingly, when data exchange is completed, the communication apparatus 100 exchanges RLS_REQ and RLS_RES with the communication apparatus 200 for deactivation.

The communication apparatuses 100 and 200 according to an embodiment of the present disclosure perform the above operation. Therefore, when a response is returned to the initiator (the communication apparatus 200) in the active communication mode and a connection of near field wireless communication is established in the active communication mode with the initiator, even if only available service information is exchanged, it is possible to start a service that is used in the passive communication mode from the initiator to the target.

When a connection of near field wireless communication is established, since the communication apparatuses 100 and 200 according to an embodiment of the present disclosure exchange only available service information, information transmitted and received when a connection of near field wireless communication is established is smaller than that of the case 1. In addition, in the case 3, when the communication apparatus 200 of the initiator side uses a service, information about all services is acquired from the communication apparatus 100 in advance, and a specific service is designated from the communication apparatus 100 and can be performed by the communication apparatus 200.

(Operation Example of Service Selection Process)

Figure 25:
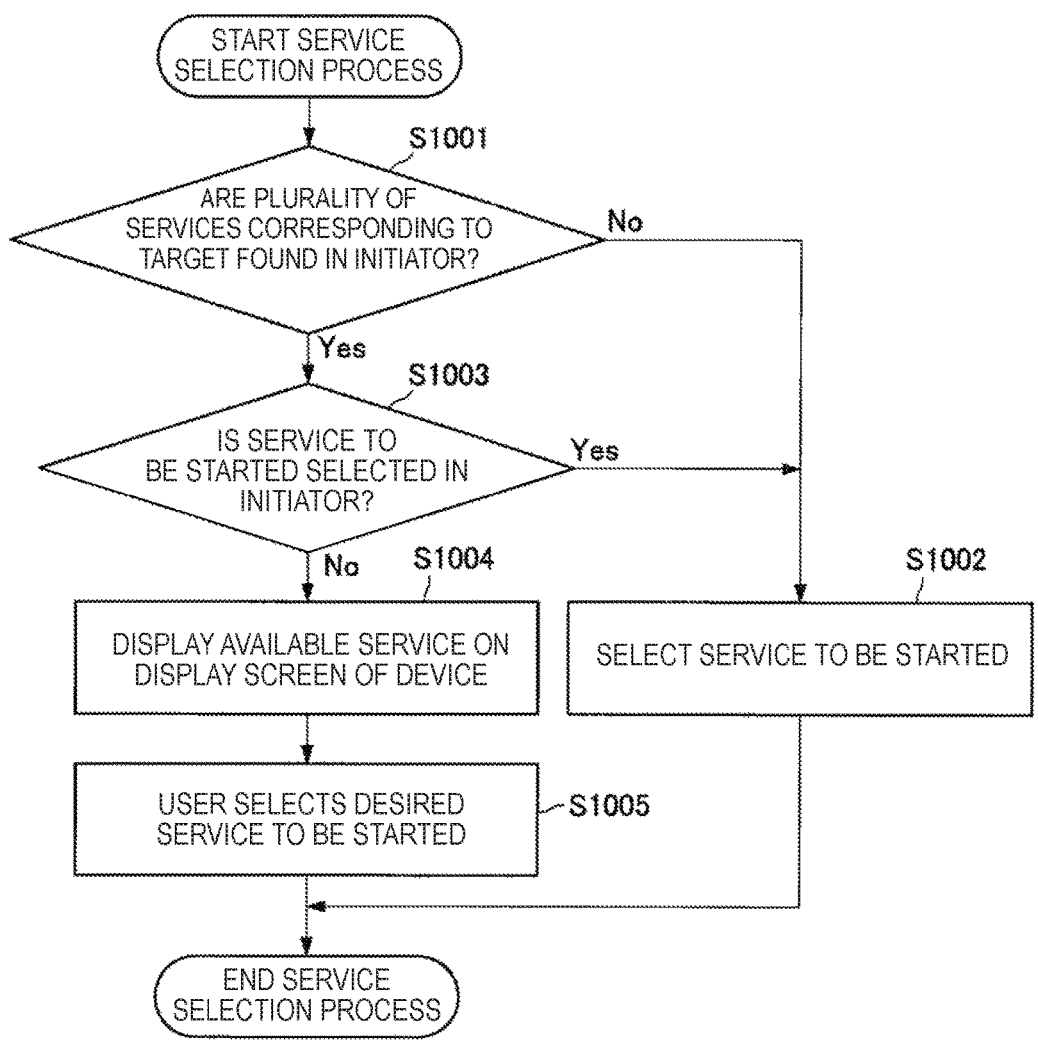
FIG. 25 is a flowchart which shows an operation example of a communication apparatus 200 of an initiator side according to an embodiment of the present disclosure.

Finally, an operation example when a service selection process is performed will be described. FIG. 25 is a flowchart which shows an operation example of the communication apparatus 200 of the initiator side according to an embodiment of the present disclosure. FIG. 25 shows an example of a service selection process of the communication apparatus 200 of the initiator side. Hereinafter, the operation example of the communication apparatus 200 according to an embodiment of the present disclosure will be described with reference to FIG. 25.

When information about a service is acquired from the communication apparatus 100 of the target side, the communication apparatus 200 selects a service based on the information about a service. In this case, the communication apparatus 200 determines whether a plurality of services corresponding to the target are found (Step S1001). Based on the determination result in Step S1001, when the plurality of services corresponding to the target are not found (No in Step S1001), the communication apparatus 200 selects one service to be started (Step S1002). On the other hand, based on the determination result in Step S1001, when the plurality of services corresponding to the target are found (Yes in Step S1001), the communication apparatus 200 then determines whether a service to be started is selected in the communication apparatus 200 (Step S1003).

Based on the determination result in Step S1003, when the service to be started is selected in the communication apparatus 200 (Yes in Step S1003), the communication apparatus 200 selects one service to be started (Step S1002). On the other hand, based on the determination result in Step S1003, when the service to be started is not selected in the communication apparatus 200 (No in Step S1003), the communication apparatus 200 outputs services available in the communication apparatus 100 to a display screen (Step S1004).

When the communication apparatus 200 outputs services available in the communication apparatus 100 to a display screen and the user selects a desired service to be started from among the services available in the communication apparatus 100 (Step S1004), the communication apparatus 200 transmits a command for starting the service selected by the user in the communication apparatus 100 to the communication apparatus 100.

Figure 26:
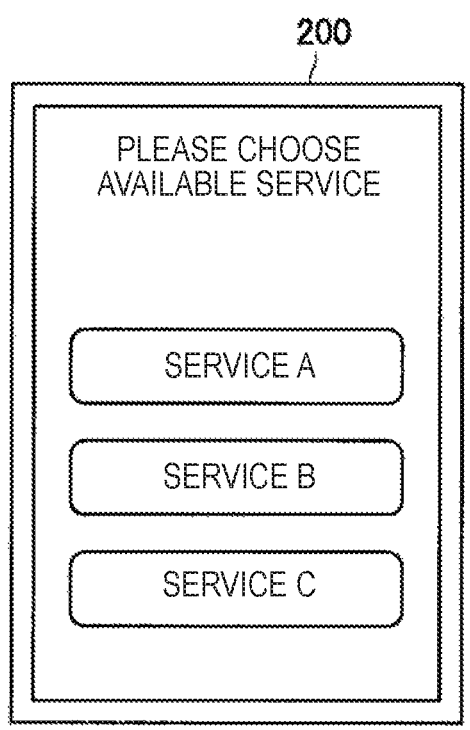
FIG. 26 is an explanatory diagram which shows an example of a screen that is output on a display screen of a communication apparatus.

FIG. 26 is an explanatory diagram which shows an example of a screen output on a display screen of the communication apparatus 200 when a service selection process is performed in the communication apparatus 200 of the initiator side. FIG. 26 shows an example of a list screen of services available in the communication apparatus 100 that is output on the display screen of the communication apparatus 200. The communication apparatus 200 outputs the screen shown in FIG. 26, and thus enables the user to select a service to be started in the communication apparatus 100. It is needless to say that, when a service selection process is performed in the communication apparatus 200 of the initiator side, a screen output on the display screen of the communication apparatus 200 is not limited to the example shown in FIG. 26.

The operation example of the communication apparatus 200 according to an embodiment of the present disclosure has been described above with reference to FIG. 25.

[1.4. Hardware Configuration Example]

Figure 27:
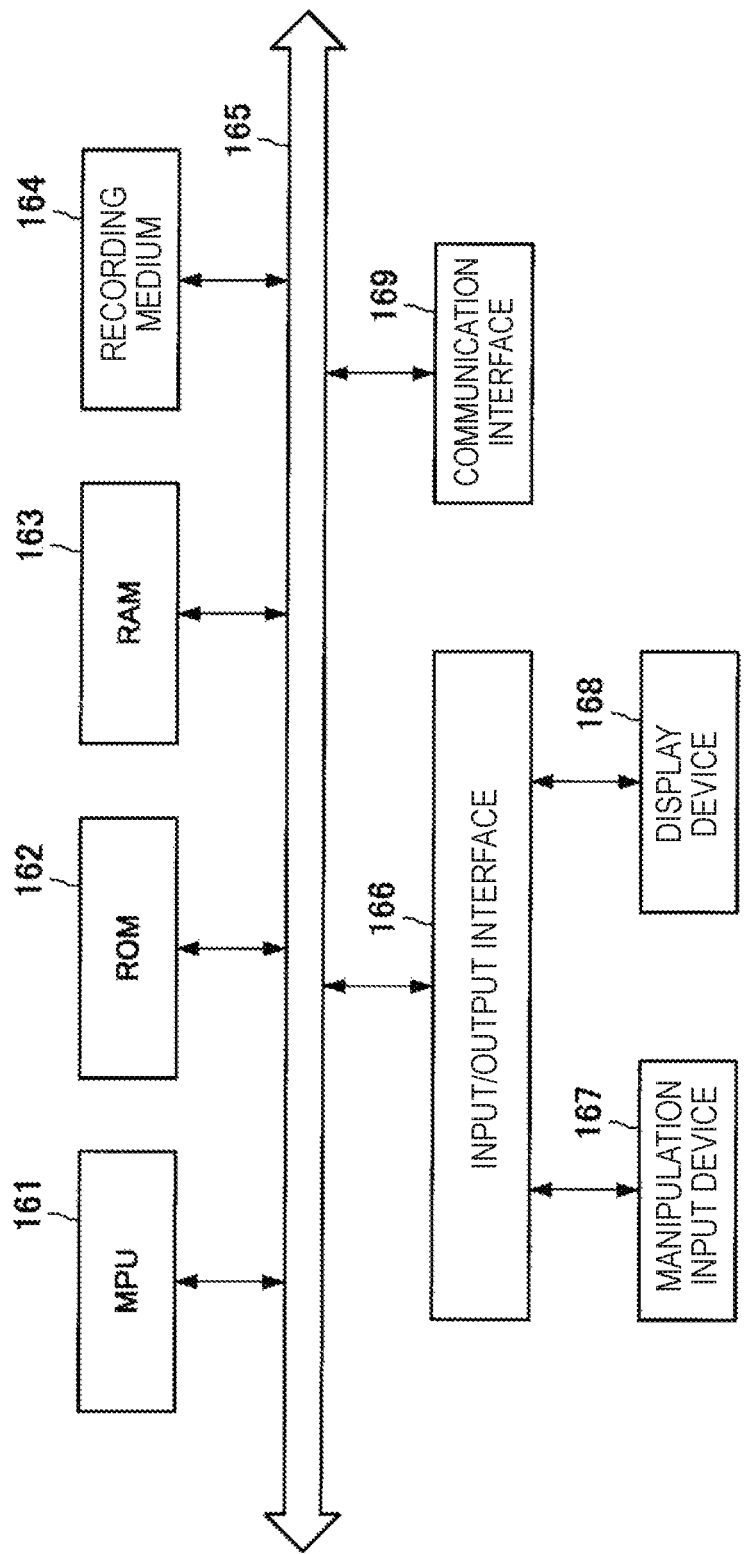
FIG. 27 is an explanatory diagram which shows a hardware configuration example of a communication apparatus.

Next, a hardware configuration example of the communication apparatuses 100 and 200 will be described. FIG. 27 is an explanatory diagram which shows a hardware configuration example of the communication apparatus 100 according to the present embodiment. While only the communication apparatus 100 is shown in FIG. 27, the communication apparatus 200 may have the same hardware configuration. As shown in FIG. 27, the communication apparatus 100 includes, for example, an MPU 161, a ROM 162, a RAM 163, a recording medium 164, an input/output interface 166, a manipulation input device 167, a display device 168, and a communication interface 169. In addition, the communication apparatus 100 connects components using, for example, a bus 165 as a transmission path of data.

The MPU 161 includes, for example, a processor including an arithmetic circuit such as a micro processing unit (MPU) or various processing circuits. The MPU 161 controls operations of components of the communication apparatus 100. Therefore, the MPU 161 may serve as an example of the device host 130 or the NFCEE 140 in the present embodiment. The ROM 162 stores a program that the MPU 161 uses and control data such as a calculation parameter. The RAM 163 temporarily stores, for example, a program performed by the MPU 161.

The recording medium 164 stores data according to an information processing method according to the present embodiment and various types of data such as various applications. Here, examples of the recording medium 164 include a magnetic recording medium such as a hard disk and a nonvolatile memory such as a flash memory. In addition, the recording medium 164 may be detachable from the communication apparatus 100. When an application recorded in the recording medium 164 is performed, the recording medium 164 may also serve as an example of the NFCEE 140.

The input/output interface 166 connects, for example, the manipulation input device 167 and the display device 168. Here, examples of the input/output interface 166 include a Universal Serial Bus (USB) terminal, a Digital Visual Interface (DVI) terminal, a High-Definition Multimedia Interface (HDMI) (registered trademark) terminal, and various processing circuits.

In addition, the manipulation input device 167 is provided, for example on the communication apparatus 100, and is connected to the input/output interface 166 inside the communication apparatus 100. Examples of the manipulation input device 167 include a button, a direction key, a rotary selector such as a jog dial, a touch panel, or combinations thereof In addition, the display device 168 is provided, for example, on the communication apparatus 100, and is connected to the input/output interface 166 inside the communication apparatus 100. Examples of the display device 168 include a liquid crystal display, an organic electro-luminescence (EL) display, and an organic light emitting diode (OLED) display.

It is needless to say that the input/output interface 166 can connect an external device such as a manipulation input device (for example, a keyboard and a mouse) or a display device as an external device of the communication apparatus 100. In addition, the display device 168 may be a device that can perform a display and can be manipulated by a user, for example, a touch screen.

The communication interface 169 performs near field wireless communication with another communication apparatus (the communication apparatus 200). Here, examples of the communication interface 169 include an NFC interface having a wireless communication antenna circuit and a carrier wave transmission circuit.

The wireless communication antenna circuit of the communication interface 169 wirelessly transmits and receives a signal. The wireless communication antenna circuit includes, for example, a resonance circuit that includes a coil having a predetermined inductance as a transmitting and receiving antenna and a capacitor having a predetermined electrostatic capacitance and a demodulating circuit. Accordingly, the wireless communication antenna circuit receives, for example, a magnetic field (carrier waves) of 13.56 MHz, and therefore demodulates data transmitted from the external device.

In addition, the carrier wave transmission circuit of the communication interface 169 includes a modulation circuit configured to perform modulation, for example, amplitude shift keying (ASK), and an amplification circuit configured to amplify an output of the modulation circuit, and transmits carrier waves that carry a carrier wave signal from the transmitting and receiving antenna of the wireless communication antenna circuit. In the carrier wave transmission circuit, transmission of the carrier waves is controlled by, for example, the MPU 161.

The communication interface 169 has the NFC interface that includes, for example, the wireless communication antenna circuit and the carrier wave transmission circuit described above, and therefore serves as the antenna 110 and the NFCC 120 which perform near field wireless communication with, for example, another communication apparatus (the communication apparatus 200).

For example, the communication apparatus 100 may further include another communication interface for performing wired or wireless communication with another device via a network (or directly). The other communication interface includes, for example, a communication antenna and a radio frequency (RF) circuit (wireless communication), an IEEE802.15.1 port and a transmitting and receiving circuit (wireless communication), an IEEE802.11 port and a transmitting and receiving circuit (wireless communication), or a local area network (LAN) terminal and a transmitting and receiving circuit (wired communication). In addition, the network according to the present embodiment includes, for example, a wired network such as a LAN or a wide area network (WAN), a wireless network such as wireless LAN (WLAN: wireless local area network) and a wireless WAN (WWAN: wireless wide area network) through a base station, or the Internet using a communication protocol such as Transmission Control Protocol/Internet Protocol (TCP/IP).

It is needless to say that the hardware configuration of the communication apparatus 100 according to the present embodiment is not limited to the configuration shown in FIG. 27. For example, the communication apparatus 100 may not include at least one or all of the recording medium 164, the manipulation input device 167, and the display device 168.

When the communication apparatuses 100 and 200 according to the present embodiment have the hardware configuration shown in FIG. 27, it is possible to perform the series of operations described above.

<2. CONCLUSION>

As described above, according to the embodiment of the present disclosure, there are provided the communication apparatuses 100 and 200 that transmit the information about a service that uses the passive communication mode when the active communication mode and the passive communication mode are provided as communication modes of near field wireless communication and a connection of near field wireless communication is established in the active communication mode with another device.

When a connection of near field wireless communication is established in the active communication mode with another device, the communication apparatuses 100 and 200 according to an embodiment of the present disclosure transmit a command in which the information about a service that uses the passive communication mode is stored to each other. When a connection of near field wireless communication is established in the active communication mode by transmitting the command, the communication apparatuses 100 and 200 according to an embodiment of the present disclosure can recognize information about all services available in the active communication mode and the passive communication mode each other.

When a connection of near field wireless communication is established in the active communication mode with another device, the communication apparatuses 100 and 200 according to an embodiment of the present disclosure may transmit both of the available service information for identifying a protocol that a service uses and NFCEE service information for identifying a service as the information about a service that uses the passive communication mode. In addition, when a connection of near field wireless communication is established in the active communication mode with another device, the communication apparatuses 100 and 200 according to an embodiment of the present disclosure may transmit only the available service information as the information about a service that uses the passive communication mode. When only the available service information is transmitted, the communication apparatuses 100 and 200 may transmit the NFCEE service information to each other using a protocol different from a protocol used during establishment in the established active communication mode. Alternatively, communication may be established in the passive communication mode after releasing the active communication mode once, and information enabling a service to be selected in the target side may be transmitted from the initiator side to the target side in the established communication.

When a connection of near field wireless communication is established in the active communication mode with another device, the communication apparatuses 100 and 200 according to an embodiment of the present disclosure transmit the command to each other and accordingly a device of the initiator side can appropriately select a service available for a device of the target side.

It is not necessary for each step in the processes executed by each apparatus according to embodiments of the present disclosure to be performed in chronological sequence, in accordance with the order described in the sequences or flow charts. For example, each step in the processes executed by each apparatus may be performed in parallel, even if the processes are performed in a different order from the order described as the flow charts.

Further, a computer program for causing hardware, such as a CPU, ROM and RAM built-into each apparatus, to exhibit functions similar to the configurations of each of the above described apparatuses can be created. Further, a storage medium storing this computer program can also be provided. Further, a series of processes can be executed with the hardware, by configuring each of the functional blocks shown by the functional block figures with hardware.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

A communication circuit configured to have an active communication mode and a passive communication mode that are provided as communication modes of near field wireless communication, and configured to, when a connection of the near field wireless communication is established in the active communication mode with another device, receive information about a service that uses the passive communication mode from the other device.

(2)

The communication circuit according to (1), wherein, when it is determined that the service that uses the passive communication mode is used from among services received from the other device, the connection established in the active communication mode with the other device is released, and a connection of the near field wireless communication with the other device is established in the passive communication mode.

(3)

The communication circuit according to (1) or (2), wherein the information about the service is protocol information about a protocol that the service uses.

(4)
The communication circuit according to (3),
wherein service information for identifying a service is further received from the other device through the near field wireless communication by using a protocol different from the protocol according to which the protocol information is received.

(5)
The communication circuit according to (3),
wherein information enabling a service corresponding to a protocol selected based on the received protocol information to be selected by the other device is transmitted through the near field wireless communication.

(6)
The communication circuit according to any one of (1) to (5),
wherein the information about the service includes protocol information for identifying a protocol that the service uses and service information for identifying a service.

(7)
The communication circuit according to (1),
wherein, when the information about the service that uses the passive communication mode used in the other device is received from the other device through the near field wireless communication, information including the information about the service that uses the passive communication mode in an own device is transmitted to the other device through the near field wireless communication.

(8)
The communication circuit according to (7),
wherein the information about the service is protocol information about a protocol that the service uses.

(9)
The communication circuit according to (8),
wherein, when information for selecting a service available using a protocol selected from the protocol information is received from the other device, the communication circuit selects a service to be used and responds to the other device through near field wireless communication.

(10)
The communication circuit according to (8),
wherein service information for identifying a service is further transmitted to the other device through the near field wireless communication by using a protocol different from the protocol according to which the protocol information is received.

(11)
A communication apparatus including:
the communication circuit according to any one of (1) to (10); and
a control unit capable of performing communication with the communication circuit.

(12)
The communication apparatus including:
the communication circuit according to any one of (1) to (10); and
an antenna that is connected to the communication circuit and performs the near field wireless communication.

(13)
A communication method including, when an active communication mode and a passive communication mode are provided as communication modes of near field wireless communication and a connection of the near field wireless communication is established in the active communication mode with another device, receiving information about a service that uses the passive communication mode from the other device.

(14)
A computer program causing a computer to execute, when an active communication mode and a passive communication mode are provided as communication modes of near field wireless communication and a connection of the near field wireless communication is established in the active communication mode with another device, receiving information about a service that uses the passive communication mode from the other device.

REFERENCE SIGNS LIST

100, 200 communication apparatus
110 antenna
120 NFCC
130 device host
140, 140a, 140b, 140c NFCEE

The invention claimed is:

1. A communication circuit configured to have an active communication mode and a passive communication mode that are provided as communication modes of near field wireless communication, and configured to:
receive, when a first connection of the near field wireless communication is established in the active communication mode with another communication circuit, information about a service that uses the passive communication mode from the another communication circuit; and
determine, based on the received information, whether to establish a second connection of the near field wireless communication with the another communication circuit in the passive communication mode,
wherein service information for identifying the service is further transmitted or received between the communication circuit and the another communication circuit through the near field wireless communication by using a protocol different from a protocol according to which the information about the service is received.

2. The communication circuit according to claim 1,
wherein, when it is determined that the service that uses the passive communication mode is used from among services received from the another communication circuit, the first connection established in the active communication mode with the another communication circuit is released and the communication circuit establishes the second connection of the near field wireless communication with the another communication circuit in the passive communication mode.

3. The communication circuit according to claim 1,
wherein the information about the service is protocol information about a protocol that the service uses.

4. The communication circuit according to claim 3,
wherein the service information for identifying the service is further received from the another communication circuit through the near field wireless communication by using the protocol different from the protocol according to which the protocol information is received.

5. The communication circuit according to claim 3,
wherein information enabling the service corresponding to a protocol selected based on the received protocol information to be selected by the another communication circuit is transmitted through the near field wireless communication.

6. The communication circuit according to claim 1,
wherein the information about the service includes protocol information for identifying a protocol that the service uses and the service information for identifying the service.

7. The communication circuit according to claim 1,
wherein, when the information about the service that uses the passive communication mode used in the another communication circuit is received from the another communication circuit through the near field wireless communication, information including the information about the service that uses the passive communication mode in an own device is transmitted to the another communication circuit through the near field wireless communication.

8. The communication circuit according to claim 7,
wherein the information about the service is protocol information about a protocol that the service uses.

9. The communication circuit according to claim 8,
wherein, when information for selecting a service available using a protocol selected from the protocol information is received from the another communication circuit, the communication circuit selects a service to be used and responds to the another communication circuit through near field wireless communication.

10. The communication circuit according to claim 8,
wherein the service information for identifying a service is further transmitted to the another communication circuit through the near field wireless communication by using the protocol different from the protocol according to which the protocol information is received.

11. A communication apparatus comprising:
a communication circuit configured to have an active communication mode and a passive communication mode that are provided as communication modes of near field wireless communication, and configured to:
receive, when a first connection of the near field wireless communication is established in the active communication mode with another communication circuit, information about a service that uses the passive communication mode from the another communication circuit; and
determine, based on the received information, whether to establish a second connection of the near field wireless communication with the another communication circuit in the passive communication mode; and
a control unit capable of performing communication with the communication circuit,
wherein service information for identifying the service is further transmitted or received between the communication circuit and the another communication circuit through the near field wireless communication by using a protocol different from a protocol according to which the information about the service is received.

12. The communication apparatus according to claim 11, further comprising an antenna that is connected to the communication circuit and performs the near field wireless communication.

13. A communication method comprising;
receiving, by a communication circuit, when an active communication mode and a passive communication mode are provided as communication modes of near field wireless communication and a first connection of the near field wireless communication is established in the active communication mode with another communication circuit, information about a service that uses the passive communication mode from the another communication circuit; and
determining, based on the received information, whether to establish a second connection of the near field wireless communication with the another communication circuit in the passive communication mode,
wherein service information for identifying the service is further transmitted or received between the communication circuit and the another communication circuit through the near field wireless communication by using a protocol different from a protocol according to which the information about the service is received.

14. A non-transitory computer-readable medium having embodied thereon a program, which when executed by a computer causes the computer to execute a method, the method comprising:
receiving, by a communication circuit, when an active communication mode and a passive communication mode are provided as communication modes of near field wireless communication and a first connection of the near field wireless communication is established in the active communication mode with another communication circuit, information about a service that uses the passive communication mode from the another communication circuit; and
determining whether to establish a second connection of the near field wireless communication with the another communication circuit in the passive communication mode based on the received information,
wherein service information for identifying the service is further transmitted or received between the communication circuit and the another communication circuit through the near field wireless communication by using a protocol different from a protocol according to which the information about the service is received.

15. The communication circuit according to claim 1,
wherein
the active communication mode is a mode in which both the communication circuit and the another communication circuit emit radio waves and perform communication, and
the passive communication mode is a mode in which the another communication circuit generates power by radio waves emitted by the communication circuit and performs communication.

* * * * *